(12) United States Patent
Ko et al.

(10) Patent No.: US 11,963,138 B2
(45) Date of Patent: Apr. 16, 2024

(54) METHOD AND APPARATUS FOR DETERMINING CANDIDATE RESOURCE FOR PARTIAL SENSING IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/172,041

(22) Filed: Feb. 21, 2023

(65) Prior Publication Data
US 2023/0199725 A1 Jun. 22, 2023

Related U.S. Application Data

(63) Continuation of application No. PCT/KR2022/006441, filed on May 4, 2022.

(60) Provisional application No. 63/186,174, filed on May 9, 2021, provisional application No. 63/184,751, filed on May 5, 2021.

(30) Foreign Application Priority Data

| May 4, 2021 | (KR) | 10-2021-0058144 |
| May 17, 2021 | (KR) | 10-2021-0063653 |
| May 20, 2021 | (KR) | 10-2021-0064973 |
| May 24, 2021 | (KR) | 10-2021-0066465 |

(51) Int. Cl.
*H04W 72/02* (2009.01)
*H04W 72/0446* (2023.01)
*H04W 72/25* (2023.01)

(52) U.S. Cl.
CPC ....... *H04W 72/02* (2013.01); *H04W 72/0446* (2013.01); *H04W 72/25* (2023.01)

(58) Field of Classification Search
CPC .. H04W 72/02; H04W 72/25; H04W 72/0446
See application file for complete search history.

(56) References Cited

U.S. PATENT DOCUMENTS

| 2020/0229171 A1 | 7/2020 | Khoryaev et al. |
| 2023/0028889 A1* | 1/2023 | Kim .................. H04W 72/542 |
| 2023/0156776 A1* | 5/2023 | Kupanna Subramani .................. H04L 5/0064 370/329 |

OTHER PUBLICATIONS

LG Electronics, R1-2103378, "Discussion on resource allocation for power saving", 3GPP TSG RAN WG1 Meeting #104bis-e, Apr. 12-20, 2021, pp. 1-21. (Year: 2021).*
PCT International Application No. PCT/KR2022/006441, International Search Report dated Aug. 5, 2022, 4 pages.

(Continued)

*Primary Examiner* — Melvin C Marcelo
(74) *Attorney, Agent, or Firm* — LEE, HONG, DEGERMAN, KANG & WAIMEY

(57) ABSTRACT

Provided is an operation method of a first device (100) in a wireless communication system. The method may comprise the steps of: triggering resource selection for sidelink (SL) transmission; determining a selection window for the resource selection; and selecting, as at least one first candidate slot, at least one slot related to at least one first sensing slot.

15 Claims, 20 Drawing Sheets

(56) References Cited

OTHER PUBLICATIONS

LG Electronics, "Discussion on resource allocation for power saving," R1-2103378, 3GPP TSG RAN WG1 Meeting #104bis-e, e-Meeting, Apr. 2021, 23 pages.
Futurewei, "Power consumption reduction for sidelink resource allocation," R1-2102780, 3GPP TSG RAN WG1 Meeting #104-bis-e, eMeeting, Apr. 2021, 11 pages.
NEC, "Discussion on resource allocation for power saving," R1-2103517, 3GPP TSG RAN WG1 #104b-e, e-Meeting, Apr. 2021, 12 pages.
Fujitsu, "Considerations on partial sensing and DRX in NR sidelink," R1-2102719, 3GPP TSG RAN WG1 Meeting #104b-e, e-Meeting, Apr. 2021, 20 pages.

\* cited by examiner

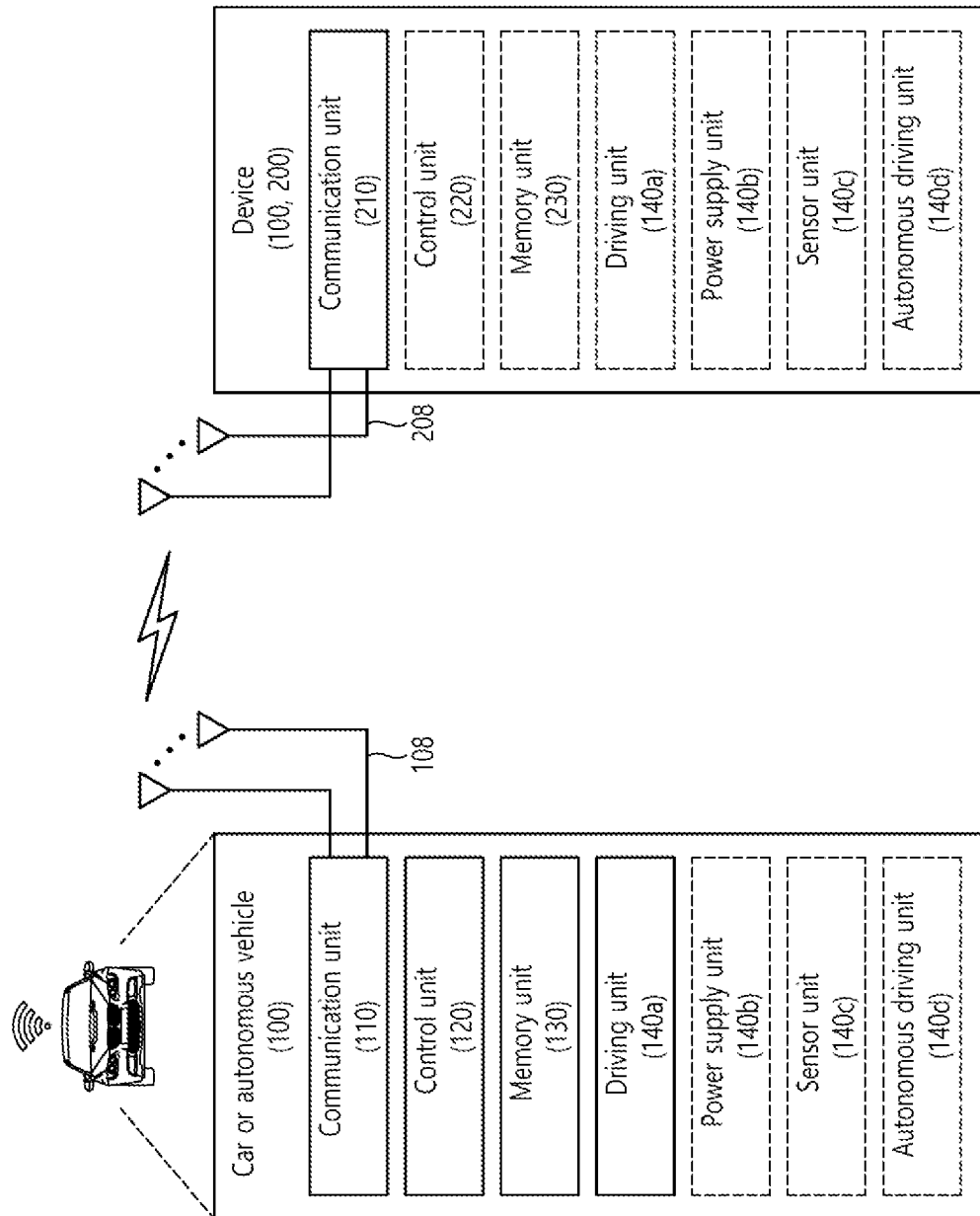

METHOD AND APPARATUS FOR DETERMINING CANDIDATE RESOURCE FOR PARTIAL SENSING IN NR V2X

CROSS-REFERENCE TO RELATED APPLICATIONS

This application is a continuation of International Application No. PCT/KR2022/006441, filed on May 4, 2022, which claims the benefit of earlier filing date and right of priority to Korean Patent Application Nos. 10-2021-0058144, filed on May 4, 2021, 10-2021-0063653, filed on May 17, 2021, 10-2021-0064973, filed on May 20, 2021, and 10-2021-0066465, filed on May 24, 2021, and also claims the benefit of U.S. Provisional Application Nos. 63/184,751, filed on May 5, 2021, and 63/186,174, filed on May 9, 2021, the contents of which are all hereby incorporated by reference herein in their entirety.

SUMMARY

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the present disclosure, a method for performing, by a first device, wireless communication may be proposed. For example, the method may comprise: triggering resource selection for a sidelink (SL) transmission; determining a selection window for the resource selection; and selecting at least one slot related to at least one first sensing slot as at least one first candidate slot, wherein the at least one first candidate slot may be included within the selection window.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: trigger resource selection for a sidelink (SL) transmission; determine a selection window for the resource selection; and select at least one slot related to at least one first sensing slot as at least one first candidate slot, wherein the at least one first candidate slot may be included within the selection window.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: trigger resource selection for a sidelink (SL) transmission; determine a selection window for the resource selection; and select at least one slot related to at least one first sensing slot as at least one first candidate slot, wherein the at least one first candidate slot may be included within the selection window.

According to an embodiment of the present disclosure, a non-transitory computer-readable storage medium storing instructions may be proposed. For example, the instructions, when executed, may cause a first device to: trigger resource selection for a sidelink (SL) transmission; determine a selection window for the resource selection; and select at least one slot related to at least one first sensing slot as at least one first candidate slot, wherein the at least one first candidate slot may be included within the selection window.

According to an embodiment of the present disclosure, a method for performing, by a second device, wireless communication may be proposed. The method may comprise: receiving, from a first device, sidelink control information (SCI) for scheduling of a physical sidelink shared channel (PSSCH) through a physical sidelink control channel (PSCCH), based on at least one transmission resource; and receiving, from the first device, a medium access control (MAC) protocol data unit (PDU) through the PSSCH, based on the at least one transmission resource, wherein the at least one transmission resource may be selected within a selection window based on a result of partial sensing, the partial sensing may be performed on at least one second sensing slot related to at least one first candidate slot, and the at least one first candidate slot may include at least one slot related to at least one first sensing slot.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, sidelink control information (SCI) for scheduling of a physical sidelink shared channel (PSSCH) through a physical sidelink control channel (PSCCH), based on at least one transmission resource; and receive, from the first device, a medium access control (MAC) protocol data unit (PDU) through the PSSCH, based on the at least one transmission resource, wherein the at least one transmission resource may be selected within a selection window based on a result of partial sensing, wherein the partial sensing may be performed on at least one second sensing slot related to at least one first candidate slot, and wherein the at least one first candidate slot may include at least one slot related to at least one first sensing slot.

Effects of the Disclosure

The user equipment (UE) may efficiently perform retransmission based on hybrid automatic repeat request (HARD) feedback.

BRIEF DESCRIPTION OF THE DRAWINGS

FIG. 20 shows a vehicle or an autonomous vehicle, based on an embodiment of the present disclosure.

DETAILED DESCRIPTION

Figure 1:
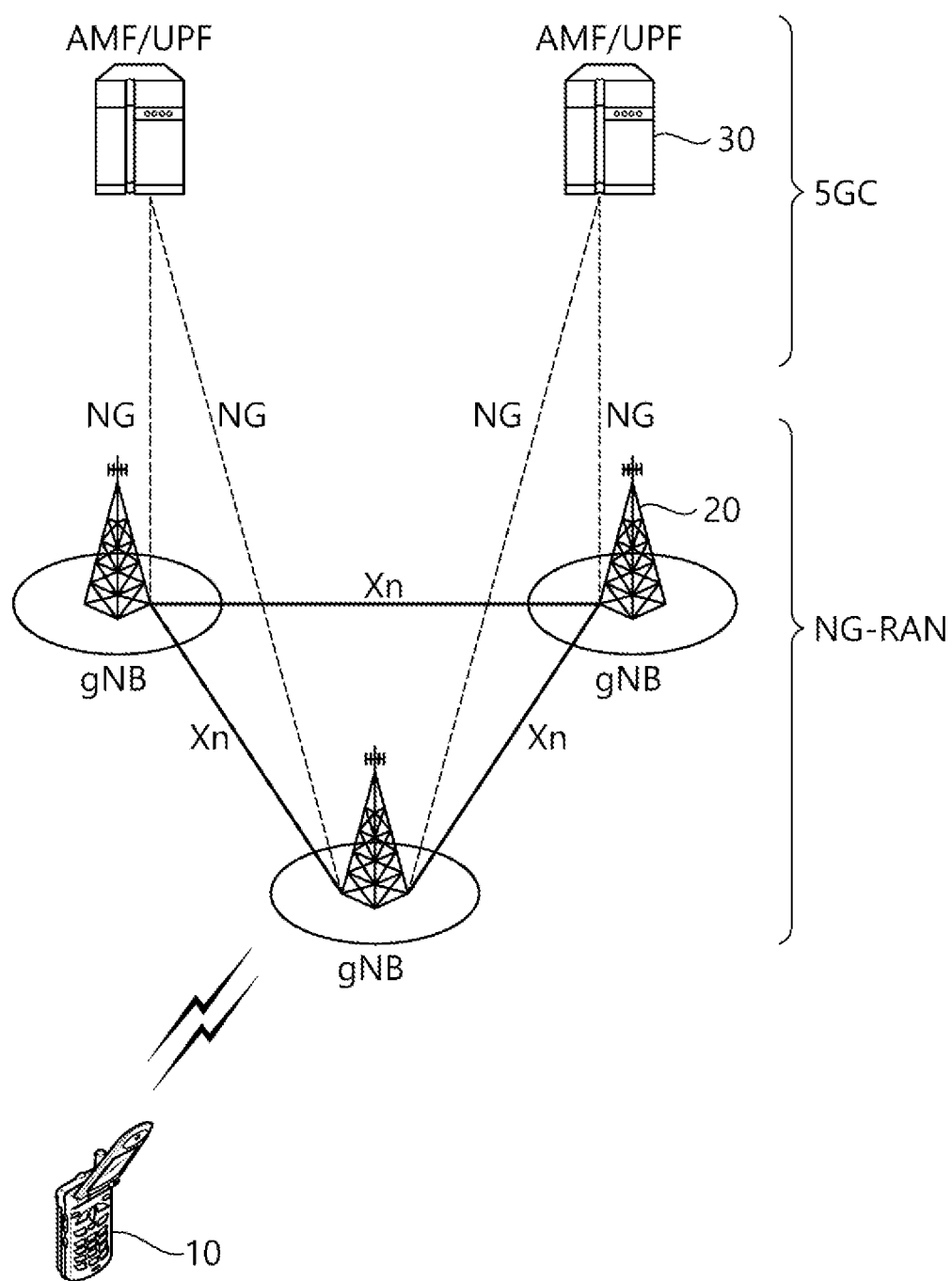
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
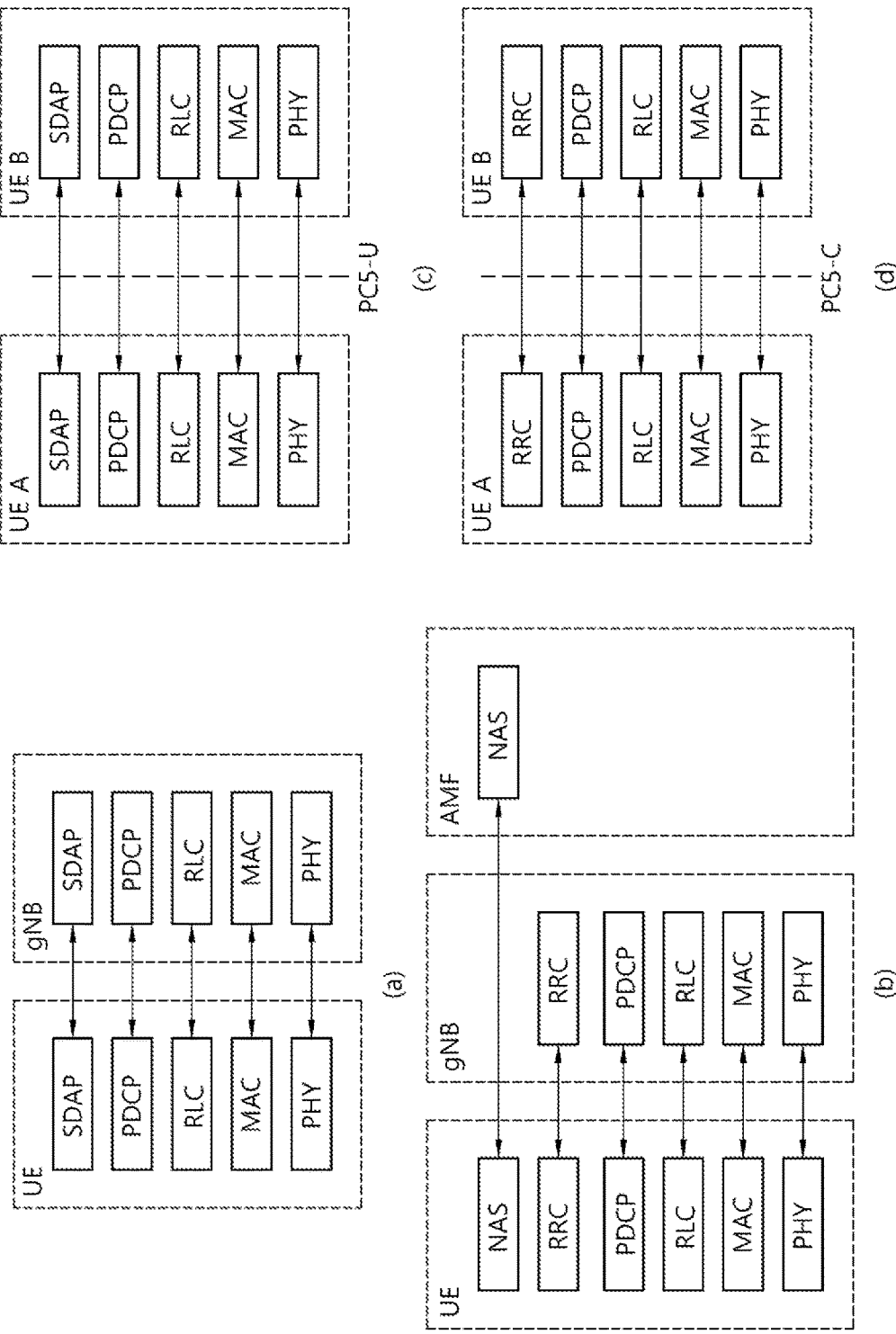
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides a higher layer with an information transfer service through a physical channel. The physical layer is connected to a medium access control (MAC) layer which is a higher layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
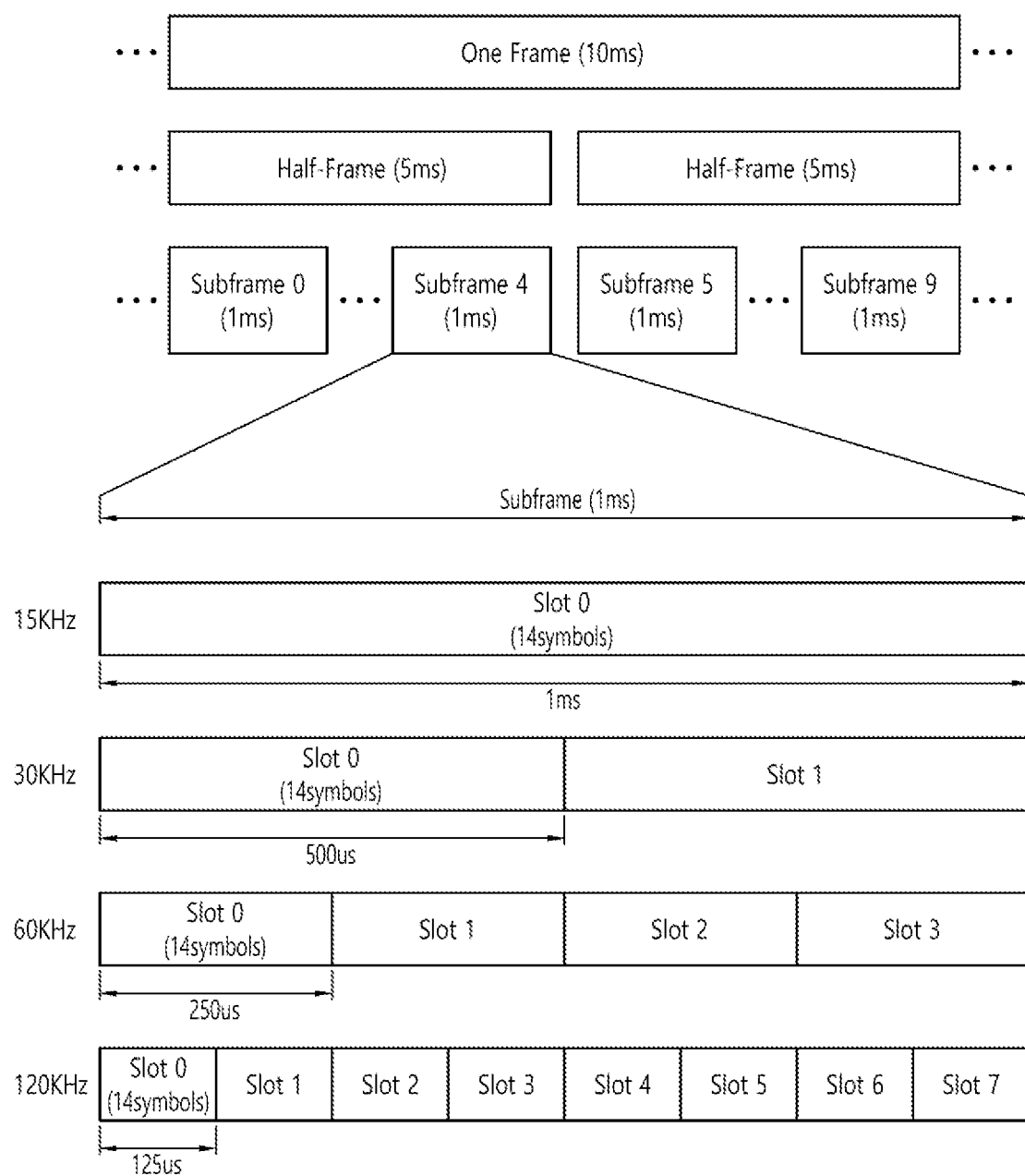
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
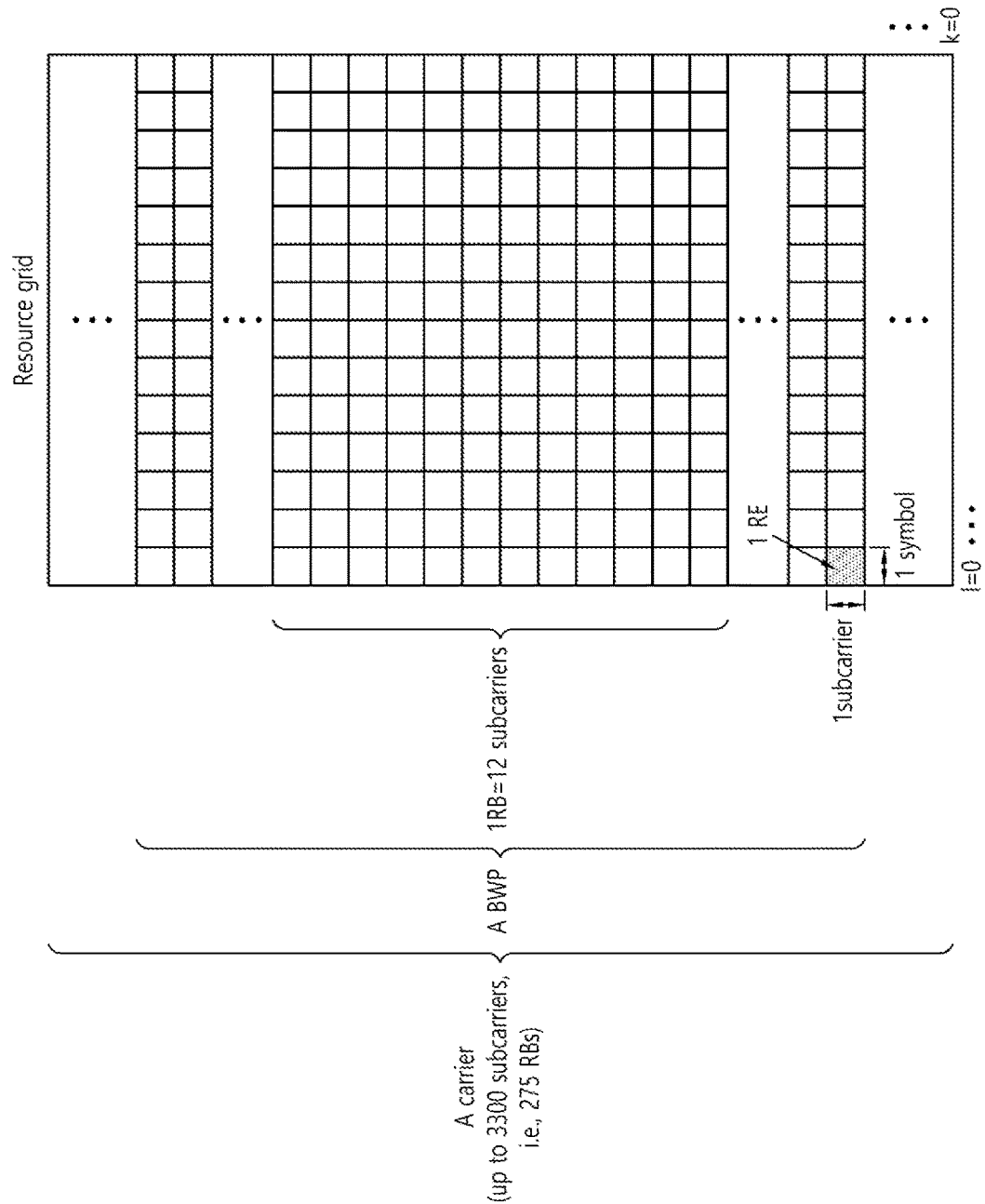
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
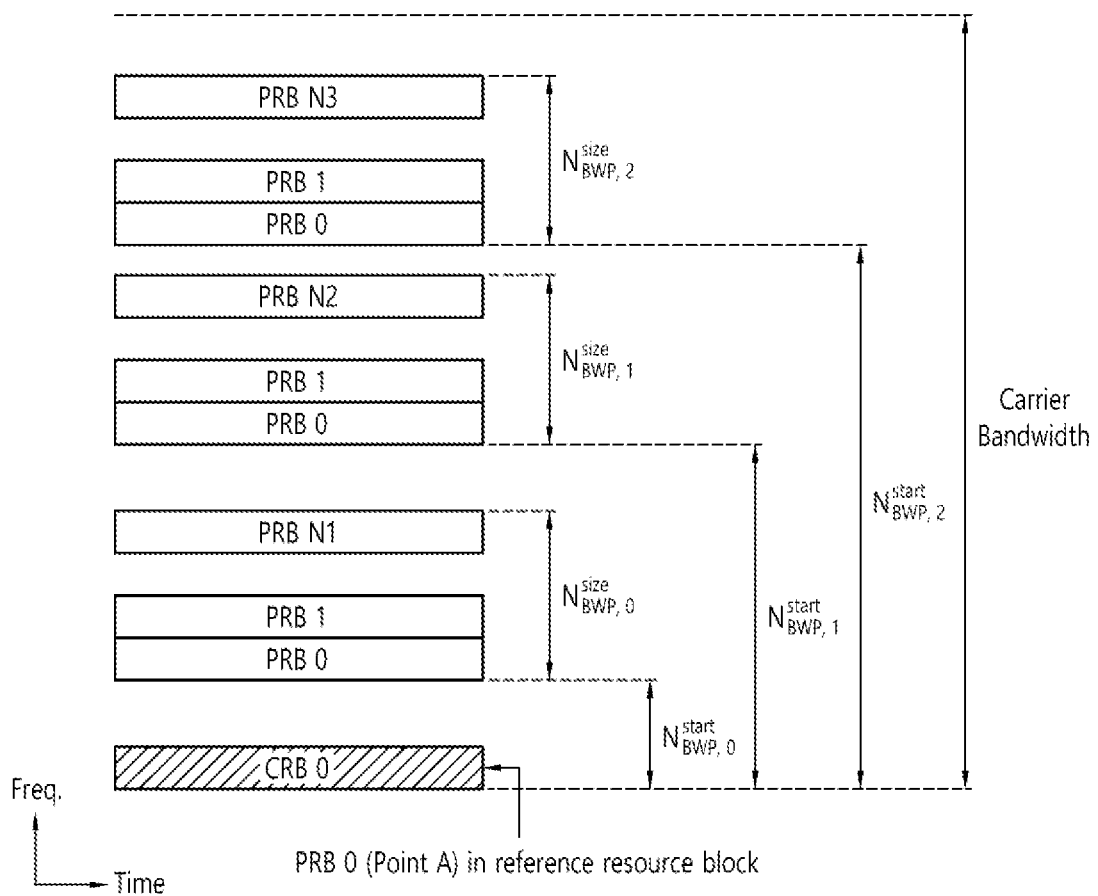
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
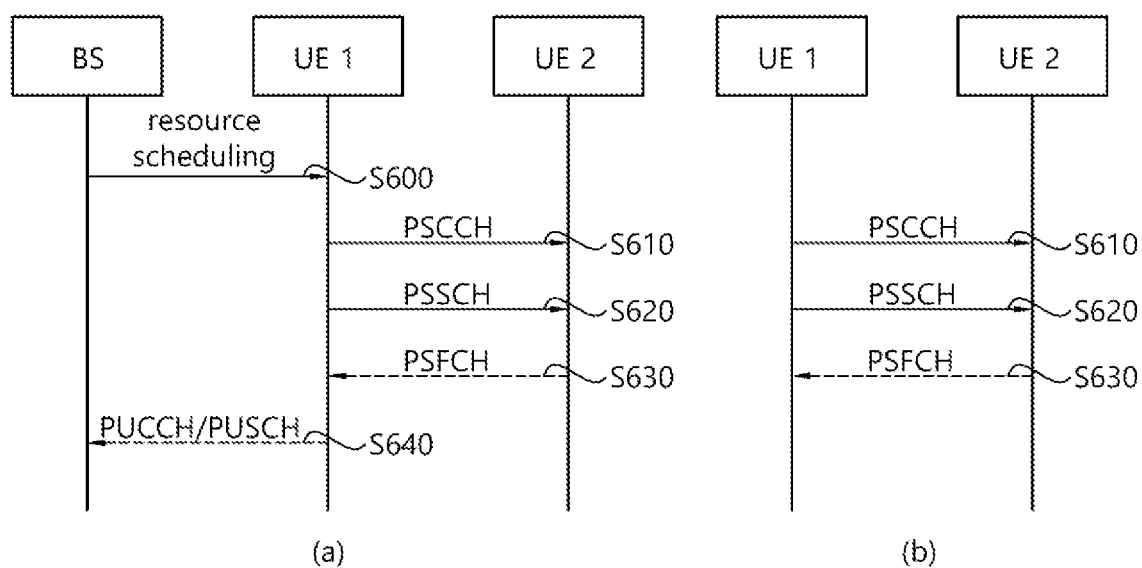
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2 (N^{SL}_{subchannel}(N^{SL}_{subChannel}+1)/2))$ bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList 2nd-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |

TABLE 5-continued

| Value of 2nd-stage SCI format field | 2nd-stage SCI format |
|---|---|
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:
HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:
HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Hereinafter, a UE procedure for determining a subset of resources to be reported to a higher layer in PSSCH resource selection in sidelink resource allocation mode 2 will be described.

In resource allocation mode 2, a higher layer may request a UE to determine a subset of resources, from which the higher layer will select a resource for PSSCH/PSCCH transmission. To trigger this procedure, in slot n, a higher layer provides the following parameters for a PSSCH/PSCCH transmission.
the resource pool from which the resources are to be reported;
L1 priority, $prio_{Tx}$;
the remaining packet delay budget;
the number of sub-channels to be used for the PSSCH/PSCCH trans mission in a slot, $L_{subCH}$;
optionally, the resource reservation interval, $P_{rsvp\_TX}$, in units of msec.
if the higher layer requests the UE to determine a subset of resource s from which the higher layer will select resources for PSSCH/PSCCH transmission a s part of re-evaluation or pre-emption procedure, the higher layer provides a set of re sources $(r_0, r_1, r_2, \ldots)$ which may be subject to re-evaluation and a set of resources $(r_0', r_1', r_2', \ldots)$ which may be subject to pre-emption.
it is up to UE implementation to determine the subset of resources a s requested by higher layers before or after the slot $r_i''-T_3$, where $r_i''$ is the slot wi th the smallest slot index among $(r_0, r_1, r_2, \ldots)$ and $(r_0', r_1', r_2', \ldots)$, and $T_3$ is equal to $T_{proc,1}^{SL}$, where $T_{proc,1}^{SL}$ is defined in slots in Table XI, where $\mu_{SL}$, is the SCS configuration of the SL BWP.

Following higher layer parameters affect this procedure:
sl-SelectionWindowList: internal parameter $T_{2min}$ is set to the corresponding value from higher layer parameter sl-SelectionWindowList for the given value of $prio_{Tx}$
sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j=prio_{TX}$.
sl-RS-ForSensing selects if the UE uses the PSSCH-RSRP or PSCCH-RSRP measurement.
sl-ResourceReservePeriodList
sl-SensingWindow: internal parameter $T_0$ is defined as the number of s lots corresponding to sl-SensingWindow msec
sl-TxPercentageList: internal parameter X for a given $prio_{Tx}$ is defined as sl-TxPercentageList ($prio_{Tx}$) converted from percentage to ratio
sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $P_{rsvp\_TX}'$.

Notation:
$(t_0'^{SL}, t_1'^{SL}, t_2'^{SL}, \ldots)$ denotes the set of slots which belongs to the sidelink resource pool.

For example, a UE may select a set of candidate resources $(S_A)$ based on Table 8. For example, when resource (re) selection is triggered, a UE may select a set of candidate resources $(S_A)$ based on Table 8. For example, when re-evaluation or pre-emption is triggered, a UE may select a set of candidate resources $(S_A)$ based on Table 8.

TABLE 8

The following steps are used:
1) A candidate single-
slot resource for transmission $R_{x,y}$ is defined as a set of $L_{subCH}$ contiguous sub-channels
with sub-channel x + j in slot $t'_y{}^{SL}$ where j = 0, . . . , $L_{subCH}$ −
1. The UE shall assume that any set of $L_{subCH}$ contiguous sub-
channels included in the corresponding resource pool within the time interval [n + $T_1$,
n + $T_2$] correspond to one candidate single-slot resource, where
   selection of $T_1$ is up to UE implementation under $0 \leq T_1 \leq T_{proc,1}{}^{SL}$, where $T_{proc,1}{}^{SL}$ is
   defined in slots in Table 8.1.4-2
   where $\mu_{SL}$ is the SCS configuration of the SL BWP;
   if $T_{2min}$ is shorter than the remaining packet delay budget (in slots) then $T_2$ is up to UE
   implementation subject to $T_{2min} \leq T_2 \leq$ remaining packet delay budget (in slots); other-
   wise $T_2$ is set to the remaining packet delay budget (in slots).
The total number of candidate single-slot resources is denoted by $M_{total}$.
2) The sensing window is defined by the range of slots [n − $T_0$, n − $T_{proc,0}{}^{SL}$) where $T_0$ is
defined above and $T_{proc,0}{}^{SL}$ is defined in slots in Table 8.1.4-1 where $\mu_{SL}$ is the
SCS configuration of the SL BWP. The UE shall monitor slots which belongs to a
sidelink resource pool within the sensing window except for those in which its own
transmissions occur. The UE shall perform the behaviour in the following steps based
on PSCCH decoded and RSRP measured in these slots.
3) The internal parameter $Th(p_i, p_j)$ is set to the corresponding value of RSRP
threshold indicated by the i-th field in sl-Thres-RSRP-List, where i = $p_i$ + ($p_j$ − 1) * 8.
4) The set $S_A$ is initialized to the set of all the candidate single-slot resources.
5) The UE shall exclude any candidate single-slot resource $R_{x,y}$ from the set $S_A$ if it
meets all the following conditions:
   the UE has not monitored slot $t'_m{}^{SL}$ in Step 2.
   for any periodicity value allowed by the higher layer parameter sl-
   ResourceReservePeriodList and a hypothetical SCI format 1-A received in slot $t'_m{}^{SL}$
   with 'Resource reservation period' field set to that periodicity value and indicating all
   subchannels of the resource pool in this slot, condition c in step 6 would be met.
5a) If the number of candidate single-slot resources $R_{x,y}$ remaining in the set $S_A$ is
smaller than X · $M_{total}$, the set $S_A$ is initialized to the set of all the candidate single-slot
resources as in step 4.
6) The UE shall exclude any candidate single-slot resource $R_{x,y}$ from the set $S_A$ if it
meets all the following conditions:
   a) the UE receives an SCI format 1-A in slot $t'_m{}^{SL}$ and 'Resource reservation period'
   field, if present, and 'Priority' field in the received SCI format 1-A indicate the
   values $P_{rsvp\_RX}$ and $prio_{RX}$, respectively according to Clause 16.4 in [6, TS 38.213];
   b) the RSRP measurement performed, according to clause 8.4.2.1 for the received
   SCI format 1-A, is higher than $Th(prio_{RX}, prio_{TX})$;
   c) the SCI format received in slot $t'_m{}^{SL}$ or the same SCI format which, if and only if
   the 'Resource reservation period' field is present in the received SCI format 1-A, is
   assumed to be received in slot(s) $t'_{m+q \times P'_{rsvp\_RX}}{}^{SL}$ determines according to clause
   8.1.5 the set of resource blocks and slots which overlaps with $R_{x,y+j \times P'_{rsvp\_TX}}$ for
   q = 1, 2, . . . , Q and j = 0, 1, . . . , $C_{resel}$ − 1. Here, $P'_{rsvp\_RX}$ is $P_{rsvp\_RX}$ converted to units of logical slots according to clause 8.1.7, $Q = \left\lceil \dfrac{T_{scal}}{P'_{rsvp\_RX}} \right\rceil$ if $P_{rsvp\_RX} < T_{scal}$ and n' − m ≤ $P'_{rsvp\_RX}$, where $t'_n{}^{SL}$ = n if slot n belongs to the set
($t'_0{}^{SL}, t'_1{}^{SL}, . . . , t'_{T_{max}-1}{}^{SL}$), otherwise slot $t'_n{}^{SL}$ is the first slot after slot n belonging
to the set ($t'_0{}^{SL}, t'_1{}^{SL}, . . . , t'_{T_{max}-1}{}^{SL}$); otherwise Q = 1. $T_{scal}$ is set to selection
window size $T_2$ converted to units of msec.
7) If the number of candidate single-slot resources remaining in the set $S_A$ is smaller
than X · $M_{total}$, then $Th(p_i, p_j)$ is increased by 3 dB for each priority value $Th(p_i, p_j)$
and the procedure continues with step 4.
The UE shall report set $S_A$ to higher layers.
If a resource $r_i$ from the set ($r_0, r_1, r_2, . . .$ ) is not a member of $S_A$, then the UE shall report
re-evaluation of the resource $r_i$ to higher layers.
If a resource $r'_i$ from the set ($r'_0, r'_1, r'_2, . . .$ ) meets the conditions below then the UE shall
report pre-emption of the resource $r'_i$ to higher layers
   $r'_i$ is not a member of $S_A$, and
   $r'_i$ meets the conditions for exclusion in step 6, with $Th(prio_{RX}, prio_{TX})$ set to the
   final threshold after executing steps 1)-7), i.e. including all necessary increments
   for reaching X · $M_{total}$, and
   the associated priority $prio_{RX}$, satisfies one of the following conditions:
      sl-PreemptionEnable is provided and is equal to 'enabled' and $prio_{TX} > prio_{RX}$
      sl-PreemptionEnable is provided and is not equal to 'enabled', and $prio_{RX} \leq prio_{pre}$
      and $prio_{TX} > prio_{RX}$ Meanwhile, partial sensing may be supported for power saving of a UE. For example, in LTE SL or LTE V2X, a UE may perform partial sensing.

Figure 7:
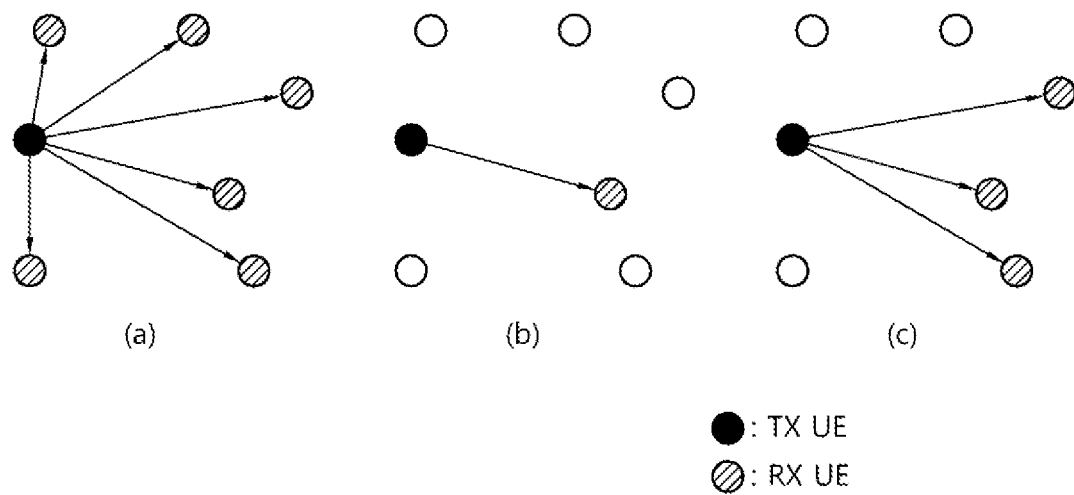
FIG. 7 shows three cast types, based on an embodiment of the present disclosure.

FIG. 7 shows three types of casts according to an embodiment of the present disclosure. The embodiment of FIG. 7 may be combined with various embodiments of the present disclosure. Specifically, FIG. 7(a) shows broadcast type SL communication, FIG. 7(b) shows unicast type SL communication, and FIG. 7(c) shows groupcast type SL communication. In the case of unicast type SL communication, a UE may perform one-to-one communication with another UE. In the case of groupcast type SL communication, a UE may perform SL communication with one or more UEs in a group to which the UE belongs. In various embodiments of the present disclosure, SL groupcast communication may be replaced with SL multicast communication, SL one-to-many communication, or the like.

In this specification, the wording "configure or define" can be interpreted as being (pre)configured (via predefined signaling (e.g., SIB, MAC signaling, RRC signaling)) from a base station or network. For example, "A may be configured" may include "a base station or network (pre)configuring/defining or notifying A of a UE". Alternatively, the wording "configure or define" may be interpreted as being previously configured or defined by the system. For example, "A may be configured" may include "A is configured/defined in advance by system".

Referring to the standard document, some procedures and technical specifications related to the present disclosure are as follows.

TABLE 9

3GPP TS 36.213 V16.2.0

14.1.1.6 UE procedure for determining the subset of resources to be reported to higher layers in PSSCH resource selection in sidelink transmission mode 4 and in sensing measurement in sidelink transmission mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}$ = 10*SL_RESOURCE_RESELECTION_COUNTER, where SL_RESOURCE_RESELECTION_COUNTER is provided by higher layers [11].

. . .

If partial sensing is configured by higher layers then the following steps are used:
1) A candidate single-subframe resource for PSSCH transmission $R_{x,y}$ is defined as a set of $L_{subCH}$ contiguous sub-channels with sub-channel x + j in subframe $t_y^{SL}$ where j = 0, . . . , $L_{subCH}$ − 1. The UE shall determine by its implementation a set of subframes which consists of at least Y subframes within the time interval [n + $T_1$, n + $T_2$] where selections of $T_1$ and $T_2$ are up to UE implementations under $T_1 \leq 4$ and $T_{2\,min}(prio_{TX}) \leq T_2 \leq 100$, if $T_{2\,min}(prio_{TX})$ is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.
2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.
3) The parameter $Th_{a,b}$ is set to the value indicated by the i-th SL-ThresPSSCH-RSRP field in SL-ThresPSSCH-RSRP-List where i = (a − 1) * 8 + b.
4) The set $S_A$ is initialized to the union of all the candidate single-subframe resources. The set $S_B$ is initialized to an empty set.

TABLE 10

5) The UE shall exclude any candidate single-subframe resource $R_{x,y}$ from the set $S_A$ if it meets all the following conditions:
  the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
  PSSCH-RSRP measurement according to the received SCI format 1 is higher than $Th_{prio_{TX},prio_{RX}}$.
  the SCI format received in subframe $t_m^{SL}$ or the same SCI format 1 which is assumed to be received in subframe(s) $t'_{m+q \times P_{step} \times P_{rsvp\_RX}}^{SL}$

TABLE 10-continued determines according to 14.1.1.4C the set of resource blocks and subframes which overlaps with $R_{x,y+j \times P_{rsvp\_TX}}$ for q = 1, 2, . . . , Q and j = 0, 1, . . . , $C_{resel}$ − 1. Here, $$Q = \frac{1}{P_{rsvp\_RX}} \text{ if } P_{rsvp\_RX} < 1 \text{ and } y' - m \leq P_{step} \times P_{rsvp\_RX} + P_{step},$$

where $t_{y'}^{SL}$ is the last subframe of the Y subframes, and Q = 1 otherwise.
6) If the number of candidate single-subframe resources remaining in the set $S_A$ is smaller than 0.2 · $M_{total}$, then Step 4 is repeated with $Th_{a,b}$ increased by 3 dB.
7) For a candidate single-subframe resource $R_{x,y}$ remaining in the set $S_A$, the metric $E_{x,y}$ is defined as the linear average of S-RSSI measured in sub-channels x + k for k = 0, . . . , $L_{subCH}$ − 1 in the monitored subframes in Step 2 that can be expressed by $t_{y-P_{step} \times j}^{SL}$, for a non-negative integer j.
8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2 · $M_{total}$.
9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous TABLE 10-continued transmission carriers, its limitation in the supported carrier
combinations, or interruption for RF retuning time [10].

TABLE 11

The UE shall report set $S_B$ to higher layers.
If transmission based on random selection is configured by upper layers and when the
UE is configured by upper layers to transmit using resource pools on multiple carriers,
the following steps are used:
1)  A candidate single-subframe resource for PSSCH transmission $R_{x,\ y}$ is defined as
    a set of $L_{subCH}$ contiguous sub-channels with sub-channel $x + j$ in subframe $t_y^{SL}$
    where $j = 0, \ldots, L_{subCH} - 1$. The UE shall assume that any set of $L_{subCH}$ contiguous
    sub-channels included in the corresponding PSSCH resource pool (described in
    14.1.5) within the time interval $[n + T_1, n + T_2]$ corresponds to one candidate
    single-subframe resource, where selections of $T_1$ and $T_2$ are up to UE
    implementations under $T_1 \leq 4$ and $T_{2\ min}(prio_{TX}) \leq T_2 \leq 100$, if $T_{2\ min}(prio_{TX})$ is
    provided by higher layers for $prio_{TX}$, otherwise $20 \leq T_2 \leq 100$. UE selection of
    $T_2$ shall fulfil the latency requirement. The total number of the candidate single-
    subframe resources is denoted by $M_{total}$.
2)  The set $S_A$ is initialized to the union of all the candidate single-subframe
    resources. The set $S_B$ is initialized to an empty set.
3)  The UE moves the candidate single-subframe resource $R_{x,\ y}$ from the set $S_A$ to $S_B$.
4)  The UE shall exclude a candidate single-subframe resource $R_{x,\ y}$ from $S_B$ if the
    UE does not support transmission in the candidate single-subframe resource in the
    carrier under the assumption that transmissions take place in other carrier(s) using
    the already selected resources due to its limitation in the number of simultaneous
    transmission carriers, its limitation in the supported carrier combinations, or
    interruption for RF retuning time [10].
The UE shall report set $S_B$ to higher layers.

For example, in various embodiments of the present disclosure, periodic-based partial sensing (PPS) may refer to an operation of performing sensing at a time point corresponding to an integer multiple (k) of each period, based on periods of the number corresponding to a specific configuration value, when performing sensing for resource selection. For example, the periods may be periods of transmission resources configured in a resource pool. For example, a resource at a time point that is earlier by an integer multiple k of each period may be sensed from a time point of a candidate resource that is a target for determining resource collision. For example, the k value may be configured in a form of a bitmap.

Figure 8:
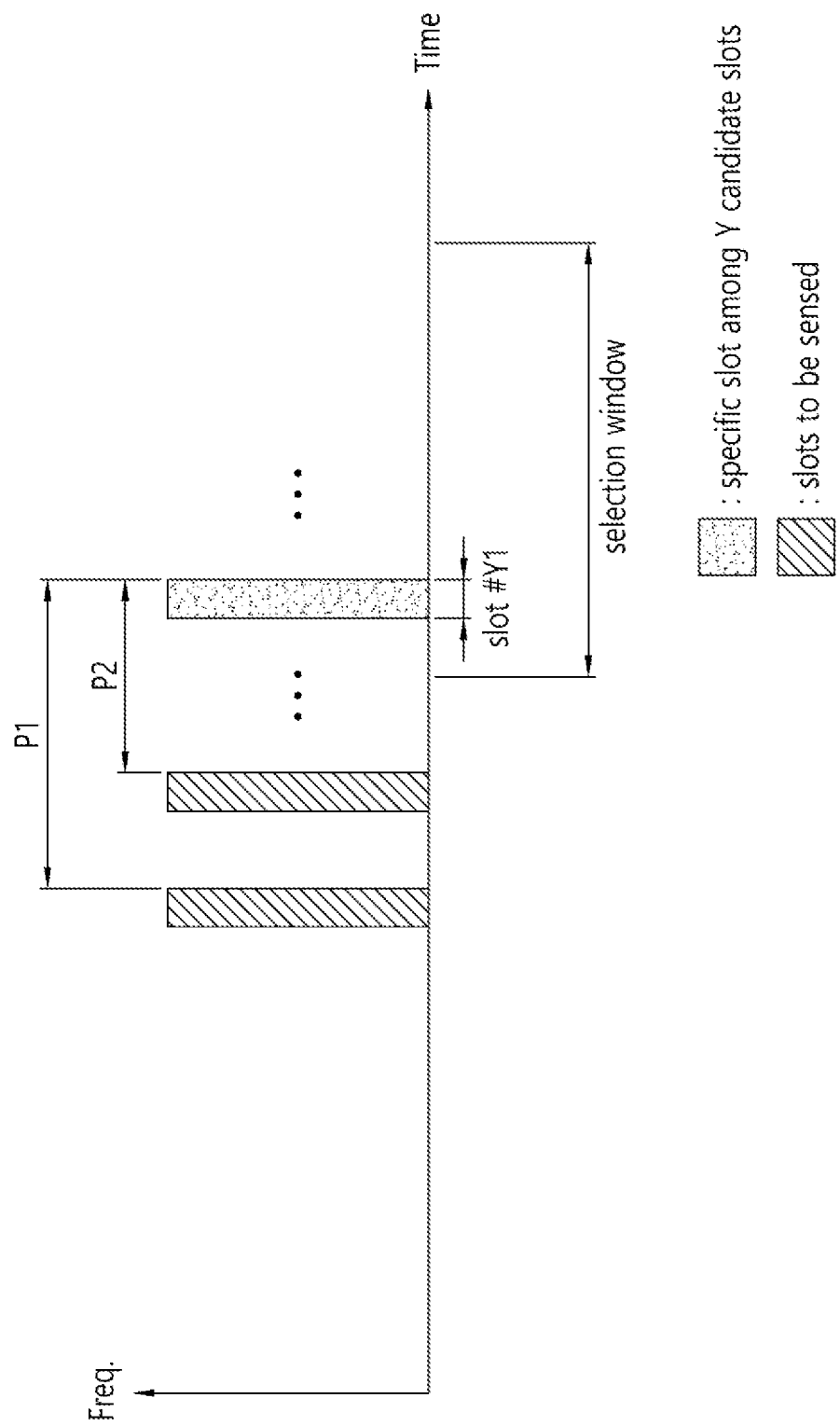
FIGS. 8 and 9 show a method for a UE to perform PPS according to an embodiment of the present disclosure.
Figure 9:
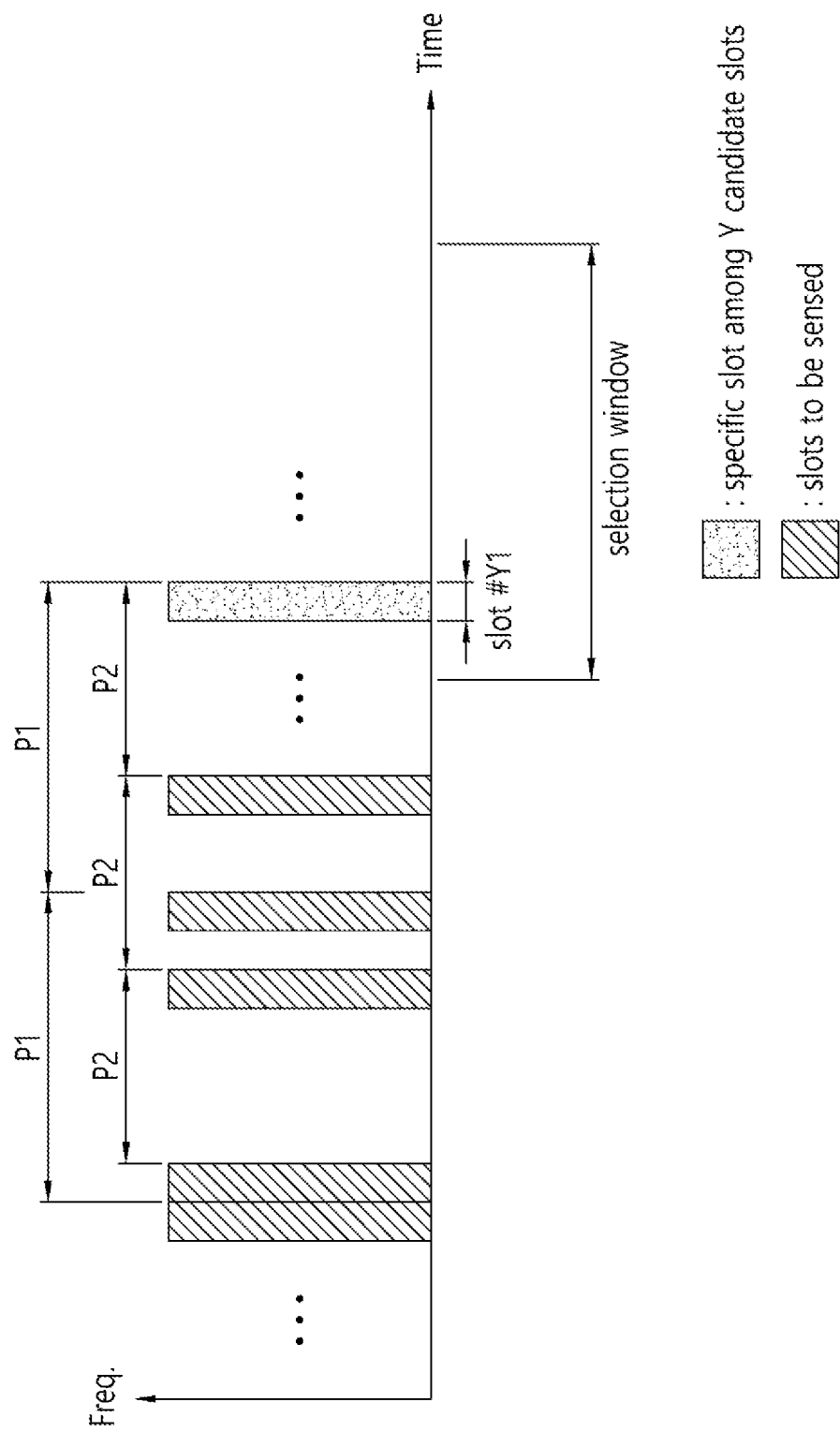

FIGS. 8 and 9 show a method for a UE to perform PPS according to an embodiment of the present disclosure. The embodiments of FIGS. 8 and 9 may be combined with various embodiments of the present disclosure.

Referring to FIGS. 8 and 9, it is assumed that a resource reservation period allowed for a resource pool or a resource reservation period configured for PPS is P1 and P2. Furthermore, it is assumed that a UE performs partial sensing (i.e., PPS) for selecting an SL resource in slot #Y1.

Referring to FIG. 8, a UE may perform sensing on a slot positioned before P1 from slot #Y1 and a slot positioned before P2 from slot #Y1.

Referring to FIG. 9, a UE may perform sensing on a slot located before P1 from slot #Y1 and a slot located before P2 from slot #Y1. Furthermore, optionally, a UE may perform sensing on a slot positioned before A * P1 from slot #Y1 and a slot positioned before B * P2 from slot #Y1. For example, A and B may be positive integers of 2 or greater. Specifically, for example, a UE selecting slot #Y1 as a candidate slot may perform sensing for slot #(Y1-resource reservation period *k), and k may be a bitmap. For example, if k is 10001, a UE selecting slot #Y1 as a candidate slot may perform sensing for slot #(Y1-P1*1), slot #(Y1-P1*5), slot #(Y1-P2*1), and slot #(Y1-P2*5).

For example, according to various embodiments of the present disclosure, continuous partial sensing (CPS) may refer to an operation of sensing all or a part of a time domain given as a specific configuration value. For example, CPS may include a short-term sensing operation in which sensing is performed for a relatively short period.

Figure 10:
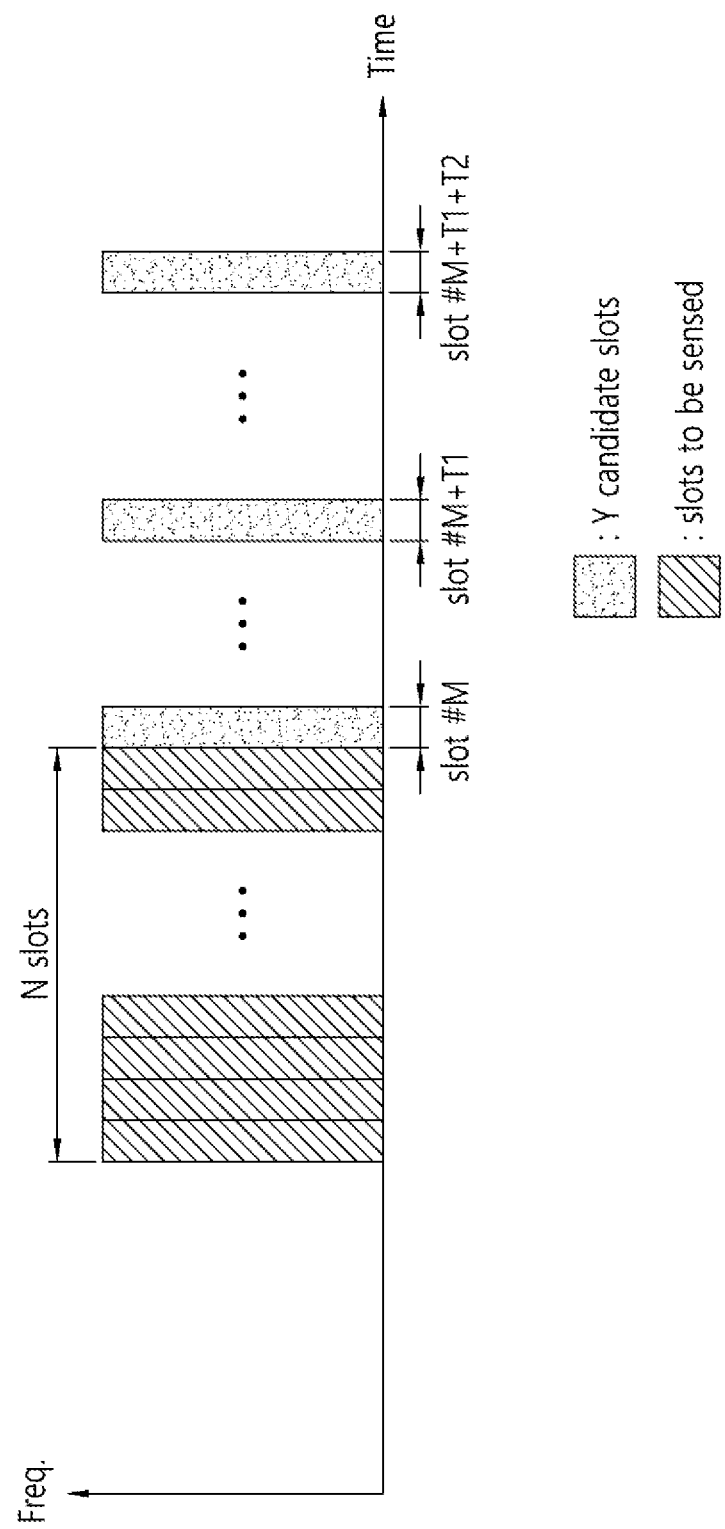
FIG. 10 shows a method for a UE to perform CPS, according to an embodiment of the present disclosure.

FIG. 10 shows a method for a UE to perform CPS, according to an embodiment of the present disclosure. The embodiment of FIG. 10 may be combined with various embodiments of the present disclosure.

In the embodiment of FIG. 10, it is assumed that Y candidate slots selected by a UE are slot #M, slot #(M+T1), and slot #(M+T1+T2). In this case, a slot in which a UE needs to perform sensing may be determined based on the first slot (i.e., slot #M) among Y candidate slots. For example, after determining the first slot among Y candidate slots as a reference slot, a UE may perform sensing for (previous) N slots from the reference slot.

Referring to FIG. 10, based on the first slot (i.e., slot #M) among Y candidate slots, a UE may perform sensing of N slots. For example, a UE may perform sensing for N slots before slot #M, the UE may select at least one SL resource from in Y candidate slots (i.e., slot #M, slot #(M+T1), and slot #(M+T1+T2)) based on a sensing result. For example, N may be configured or pre-configured for a UE. For example, a time gap for processing may exist between the last slot among the N slots and slot #M.

Meanwhile, in the existing candidate resource selection method, a performance degradation problem may occur because only random selection is applied to the first packet of periodic transmission.

According to an embodiment of the present disclosure, a method of selectively applying random selection and contiguous partial sensing (CPS)-based resource selection to the first packet of periodic transmission and a device supporting the method are proposed.

For example, for (or, for each of) at least one among elements/parameters of service type (and/or (LCH or service) priority and/or QOS requirements (e.g., latency, reliability, minimum communication range) and/or PQI parameters) (and/or HARQ feedback enabled (and/or disabled) LCH/MAC PDU (transmission) and/or CBR measurement value of a resource pool and/or SL cast type (e.g., unicast, groupcast, broadcast) and/or SL groupcast HARQ feedback option (e.g., NACK only feedback, ACK/NACK feedback, NACK only feedback based on TX-RX distance) and/or SL mode 1 CG type (e.g., SL CG type 1/2) and/or SL mode type (e.g., mode 1/2) and/or resource pool and/or PSFCH resource configured resource pool and/or source (L2) ID (and/or destination (L2) ID) and/or PC5 RRC connection/ link and/or SL link and/or (with base station) connection state (e.g., RRC connected state, IDLE state, inactive state) and/or whether an SL HARQ process (ID) and/or (of a transmitting UE or a receiving UE) performs an SL DRX operation and/or whether it is a power saving (transmitting or receiving) UE and/or (from the perspective of a specific UE) case when PSFCH transmission and PSFCH reception (and/or a plurality of PSFCH transmissions (exceeding UE capability)) overlap (and/or a case where PSFCH transmission (and/or PSFCH reception) is omitted) and/or a case where a receiving UE actually (successfully) receives a PSCCH (and/or PSSCH) (re)transmission from a transmitting UE, etc.), whether the rule is applied (and/or the proposed method/rule-related parameter value of the present disclosure) may be specifically (or differently or independently) configured/allowed. In addition, in the present disclosure, "configuration" (or "designation") wording may be extended and interpreted as a form in which a base station informs a UE through a predefined (physical layer or higher layer) channel/signal (e.g., SIB, RRC, MAC CE) (and/or a form provided through pre-configuration and/or a form in which a UE informs other UEs through a predefined (physical layer or higher layer) channel/signal (e.g., SL MAC CE, PC5 RRC)), etc. In addition, in this disclosure, the "PSFCH" wording may be extended and interpreted as "(NR or LTE) PSSCH (and/or (NR or LTE) PSCCH) (and/or (NR or LTE) SL SSB (and/or UL channel/signal))". And, the methods proposed in the present disclosure may be used in combination with each other (in a new type of manner).

For example, the term "specific threshold" below may refer to a threshold value defined in advance or (pre-) configured by a higher layer (including an application layer) of a network, a base station, or a UE. Hereinafter, the term "specific configuration value" may refer to a value defined in advance or (pre-)configured by a higher layer (including an application layer) of a network, a base station, or a UE. Hereinafter, "configured by a network/base station" may mean an operation in which a base station configures (in advance) a UE by higher layer RRC signaling, configures/ signals a UE through MAC CE, or signals a UE through DCI.

Hereinafter, PPS (or PBPS) means periodic-based partial sensing, and may mean an operation of performing sensing at a time point corresponding to an integer multiple (k) of each period based on periods of a specific configuration value number when sensing for resource selection is performed. For example, the periods may be a period of the transmission resource set in a transmission pool, a resource of an integer multiple (k value) of each period before the candidate resource time, which is a target for determining resource collision in time, may be sensed, the k value may be configured in a form of a bitmap. Hereinafter, CPS may mean continuous partial sensing, and may mean an operation of sensing all or a part of a time domain given as a specific configuration value. For example, CPS may include a short-term sensing (STS) operation in which sensing is performed for a relatively short period.

According to an embodiment of the present disclosure, when partial sensing is configured and periodic transmission is allowed in the resource pool, when selection of periodic transmission resources is triggered in slot n and a UE performs PPS to select periodic transmission resources, the following operations may be possible.

For example, for the first transport block (TB) transmission corresponding to the start of periodic transmission, because the timing of resource (re)selection cannot be known in advance, PPS results may be insufficient or absent. In this case, if an exceptional resource pool is configured in the resource pool, a UE may transmit the first TB transmission through a resource of an exceptional resource pool, and in this case, the UE may determine a resource through random resource selection. If an exceptional resource pool is not configured, a UE may perform CPS after the resource (re)selection time point, and select an idle resource within a resource selection window based on the CPS result. In this case, for example, the resource selection window may be configured at a time when it (a CPS window period) is temporally shifted after a CPS window period in which the CPS is to be performed.

For example, a transmission resource period for performing the PPS may be configured to one of a plurality of period sets composed of all or part of transmission resource periods configured in the resource pool. For example, an index for a transmission resource period set for PPS among the period sets may be configured to a UE. For example, transmission periods in each set may consist of the shortest transmission periods of P (e.g., slots), and the P value can be configured separately based on QoS requirements such as latency/ reliability/distance related to transmitted packets, service/ packet priority, cast type, congestion/interference level of resource pool, transmit power level, whether it is HARQ Enabled/disabled MAC PDU transmission, HARQ ACK/ NACK ratio, number of (consecutive) HARQ NACK receptions, whether it is an SL DRX operation, whether it is an inter-UE coordinating/coordinated UE, whether it is a relaying/remote UE, sync selection priority of a reference sync signal of a UE, MCS size/number of layers, CSI, remaining battery power amount of a UE, PDB of remaining transmission packets, maximum number of retransmissions for packets, number of remaining retransmissions, whether the peer UE is a P-UE, the number of selected candidate resources/ slots.

For example, for a transmission resource period for performing the PPS, among transmission resource periods configured in the resource pool, a transmission period smaller than or equal to a CPS window length or greater than the transmission period of a periodic transmission packet to be transmitted by a UE may be excluded. That is, a transmission resource period configured in a resource pool that is greater than or equal to the resource reservation interval signaled by SCI may be excluded from the transmission resource periods for PPS.

For example, when all transmission resource periods configured in the resource pool are smaller than or equal to the length of the CPS window, a UE may perform only CPS without performing PPS.

For example, for each resource transmission period for performing the PPS, a UE may perform PPS for each time point ahead of a specific reference time point by an integer multiple of 1 to K times the resource transmission period in time. In this case, for example, the specific reference time point may be a time point ahead of the first candidate resource/slot time point by T_proc,0+T_proc,1, which is a minimum processing time required for a UE to select a resource based on a sensing result. For example, for the K value, a UE may be configured with a minimum value Kmin, and a K value greater than Kmin may be determined by a UE implementation. For example, when the first candidate resource/slot time point is t_y0, the specific reference time point may be greater than or equal to t_y0-T_proc,0-T_proc,1 and less than or equal to t_y0-T_proc,0, based on the processing time T_proc,0 required for a UE to collect and analyze sensing results and the processing time T_proc,1 required for a UE to (re)select a resource based on a sensing result.

For example, when a UE performs PPS for the candidate resource/slot, when applying PPS for integer multiple time points up to K times for the configured transmission resource period, conditions required to complete the PPS for that candidate resource/slot may not be met due to the impossibility of performing PPS due to an operation of performing UL transmission at a specific k integer multiple time point. In this case, a UE may complete the PPS operation for the corresponding candidate resource/slot by selecting an idle/transmission resource from among the remaining candidate resources/slots other than the corresponding candidate resource/slot or by performing PPS based on an integer multiple value other than an integer multiple determined based on the configured K value in a UE implementation.

For example, when the resource transmission period configured for PPS to a UE by network is configured as a part of the resource transmission periods configured in the resource pool, the UE may perform PPS and determine a resource based on the resource transmission period corresponding to the union of the resource transmission period configured for PPS and the transmission period of the packet to be transmitted by the UE itself.

For example, a UE may perform PPS based on the priority of the packet transmitted by the UE, based on the resource transmission period corresponding to the union of the resource transmission period configured for PPS and the transmission period of the packet to be transmitted by the UE itself. For example, a UE may perform PPS only when the priority value of the transmission packet is greater than or equal to a specific threshold, based on the resource transmission period corresponding to the union of the resource transmission period configured for PPS and the transmission period of the packet to be transmitted by the UE itself. For example, the specific threshold value may be a pre-emption priority value configured in a resource pool.

For example, when a resource transmission period configured for the PPS to a UE by network is configured as a part of resource transmission periods configured in the resource pool, the UE may perform PPS based on the resource transmission periods corresponding to the union of a resource transmission period configured for the PPS, a transmission period of a packet to be transmitted by the UE itself, a resource transmission period of another UE obtained by the UE based on sensing and/or a resource transmission period of another UE included in a coordination message between UEs received by the UE.

For example, the operation of including a resource transmission period of another UE and/or a resource transmission period of another UE included in an inter-UE coordination message received by a UE in the resource transmission periods for the PPS to be finally used by the UE may be determined based on the priority of a packet related to a transmission of another UE. For example, only when the priority value of a packet to be transmitted by another UE, obtained through sensing or through a coordination message between UEs, is less than or equal to a specific threshold value, the resource transmission period of the another UE and/or the resource transmission period of the another UE included in the inter-UE coordination message received by the UE may be included in the resource transmission periods for the PPS to be finally used by the UE. For example, the specific threshold value may be a preemption priority value configured in the resource pool. For example, the specific threshold value may be a priority value of a packet to be transmitted by the UE.

For example, when a resource transmission period configured for PPS to a UE by network is configured as a part of resource transmission periods configured in the resource pool, the UE may perform PPS based on resource transmission periods corresponding to the union of the resource transmission period configured for the PPS, and a resource transmission period capable of monitoring a sensing occasion included in an SL DRX on-duration of an RX-UE or an SL DRX on-duration configured UE-commonly among resource transmission periods configured in the resource pool.

For example, if resource transmission periods configured for the PPS to a UE by network is configured to the entire resource transmission periods configured in the resource pool, the UE may use only the resource transmission periods configured for the PPS, and a resource transmission period capable of monitoring a sensing occasion included in an SL DRX on-duration of an RX-UE or an SL DRX on-duration configured UE-commonly among resource transmission periods configured in the resource pool as the final resource transmission periods for PPS.

According to an embodiment of the present disclosure, when partial sensing is configured and periodic transmission is allowed in the resource pool, when selection of an aperiodic transmission resource is triggered in slot n and a UE performs CPS to select an aperiodic transmission resource, the following operations may be possible.

For example, a resource selection window for performing aperiodic transmission may be configured/determined to be smaller than or equal to the maximum time interval between reserved resources that can be signaled by one SCI. For example, a resource selection window may be smaller than or equal to 31 slots.

For example, a resource selection window for performing aperiodic transmission may be configured/determined to be smaller than or equal to the maximum time interval between reserved resources that can be signaled by one SCI, only if resource re-evaluation and/or pre-emption checking are not allowed for the resource pool.

For example, within a resource selection window determined by UE implementation, within a period smaller than or equal to the maximum time interval between reserved resources that can be signaled as one SCI from the starting point of the resource selection window, a UE may select a number of candidate slots less than or equal to a specific threshold. For example, at least a resource for initial transmission may be selected from candidate slots having a number less than or equal to the specific threshold. For example, at least resources for initial transmission and retransmission resources having a specific set value may be selected, from among candidate slots with a number less than or equal to a specific threshold.

For example, when the first SL slot/resource time point in the resource selection window is t_y0, the end point of the CPS window may be greater than or equal to t_y0-T_proc, 0-T_proc,1 and less than or equal to t_y0-T_proc,0, based on the processing time T_proc,0 required for a UE to collect and analyze sensing results and the processing time T_proc,1 required for a UE to (re)select a resource based on the sensing result.

Figure 11:
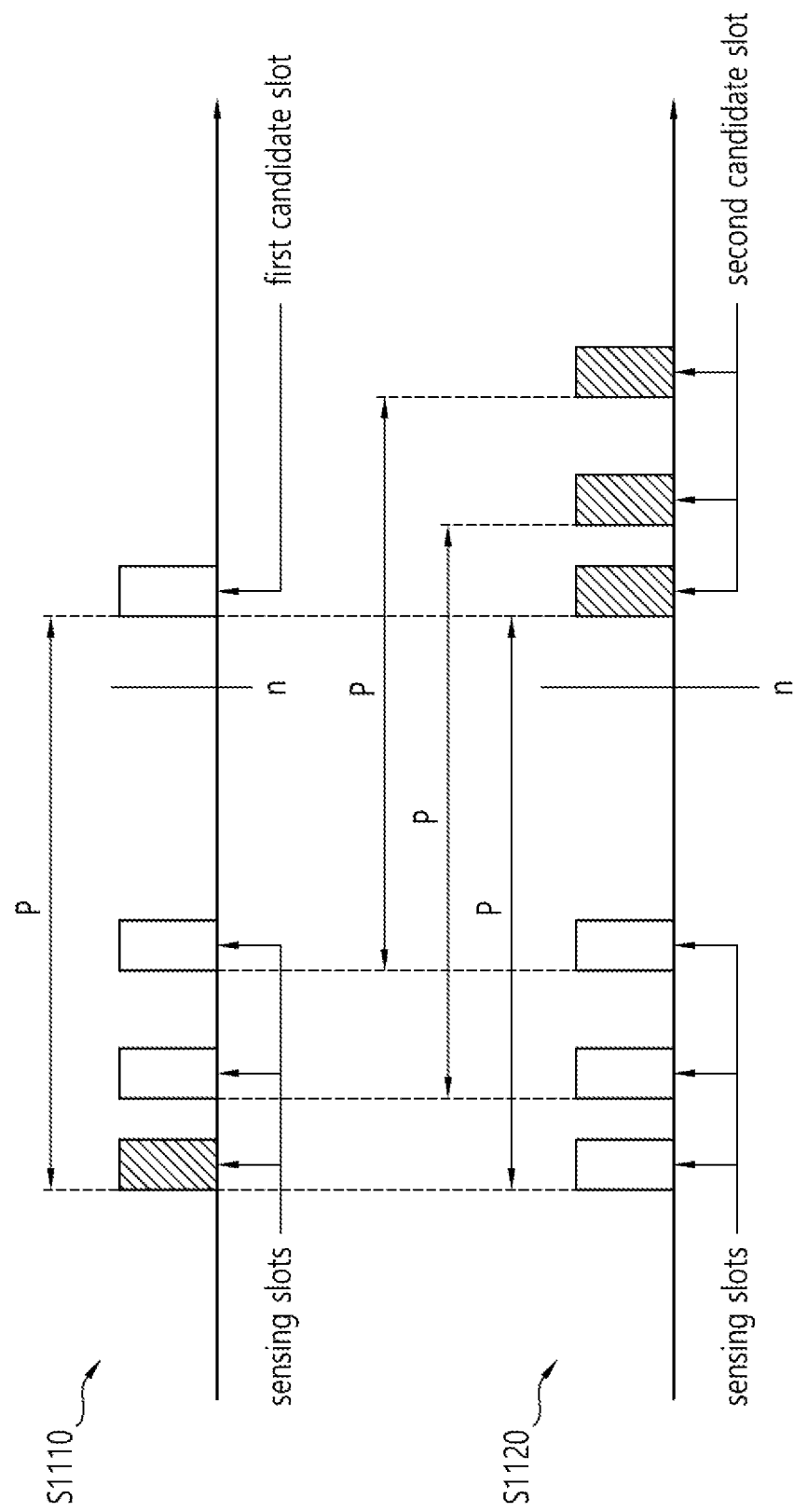
FIG. 11 shows a procedure for determining a candidate slot to be subjected to partial sensing according to an embodiment of the present disclosure.

FIG. 11 shows a procedure for determining a candidate slot to be subjected to partial sensing according to an embodiment of the present disclosure. The embodiment of FIG. 11 may be combined with various embodiments of the present disclosure.

Referring to FIG. 11, the time axis related to resource selection triggered at time point n and slots related to the time axis are shown. In step S1110, the time point n represents a time point at which resource selection is triggered. For example, a first candidate slot may be a slot first selected by a UE to select a candidate slot for partial sensing. For example, when a UE selects the first candidate slot, sensing slots to be subjected to partial sensing may be determined based on the resource reservation period (P).

In step S1120, second candidate slots may be determined based on the determined sensing slots. For example, the second candidate slots may be determined based on the temporal location of each sensing slot and a resource reservation period. For example, the second candidate slots may include the first candidate slot.

In addition to the determined second candidate slots, a UE may include other slots within a selection window as the final candidate slot for partial sensing, and the UE may perform partial sensing on sensing slots related to the final candidate slots. Here, the first candidate slot and the second candidate slot may be included in the selection window.

Figure 12:
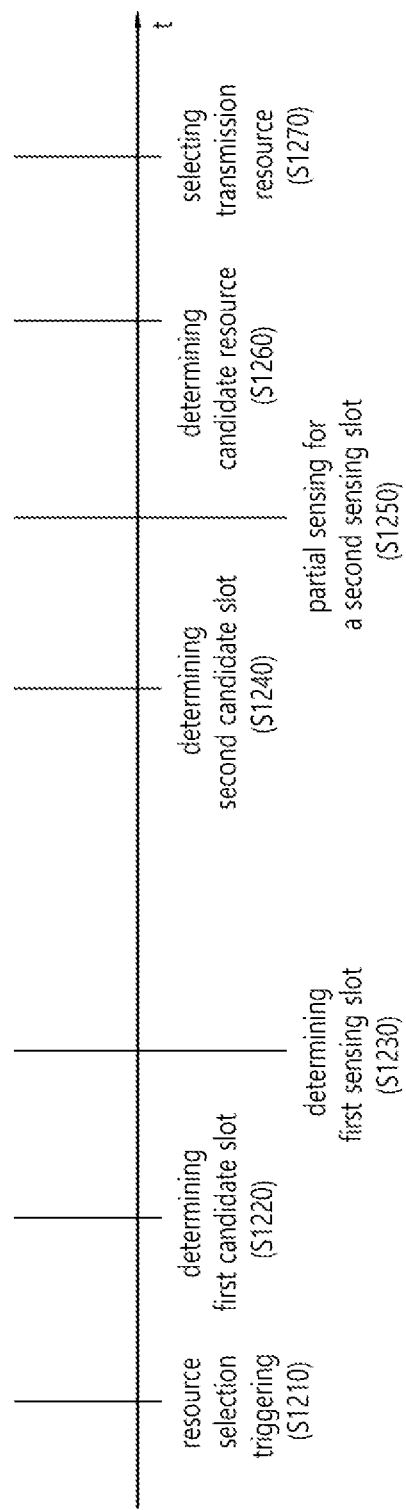
FIG. 12 shows a procedure for selecting a transmission resource based on partial sensing, according to an embodiment of the present disclosure.

FIG. 12 shows a procedure for selecting a transmission resource based on partial sensing, according to an embodiment of the present disclosure. The embodiment of FIG. 12 may be combined with various embodiments of the present disclosure.

Referring to FIG. 12, a procedure for performing transmission resource selection by a UE based on partial sensing is shown. In step S1210, a UE may trigger resource selection. In step S1220, the UE may determine a first candidate slot for resource selection. In step S1230, the UE may determine at least one first sensing slot related to the first candidate slot. For example, the at least one first sensing slot may include a slot prior to the first candidate slot by an integer multiple of a resource reservation period related to PBPS. In step S1240, the UE may determine at least one second candidate slot based on the at least one first sensing slot. In step S1250, the UE may perform partial sensing on at least one second sensing slot related to the second candidate slot. In step S1260, the UE may determine a candidate resource based on the result of the partial sensing. In step S1270, the UE may select a transmission resource for performing SL communication based on the candidate resource.

For example, in order for UE-A to assist UE-B in selecting resources, from the perspective of UE-A, when UE-A transmits a set of resources that are easy to receive from UE-B (hereafter preferred resource) or a set of resources unsuitable for reception from UE-B (hereafter non-preferred resource) to UE-B through an inter-UE coordination message, the UE-B may select to include the preferred resource of UE-A and/or may select not to include the non-preferred resource of UE-A in selecting a resource selection window or Y candidate resources for PPS in the resource selection window.

For example, after selecting a resource selection window and Y candidate resources for PPS within the resource selection window by UE implementation, UE-B may extend or shift the resource selection window in the time domain to include the preferred resource from the UE-A and/or may exclude the non-preferred resource from UE-A from the selected resource selection window and candidate resources for PPS within the resource selection window.

For example, when a UE performs PPS and/or CPS to (re)select resources for periodic transmission, when transmitting the first TB of periodic transmission or when a partial sensing result is not sufficient due to an SL DRX operation (e.g., when the number of partial sensing slots is less than a specific threshold value), after obtaining a partial sensing result for the longest transmission resource period configured in the transmission resource pool to be used for the periodic transmission, the UE may perform the periodic transmission by selecting a resource based on the obtained partial sensing result. For example, after transmitting the first TB based on a resource selected based on random resource selection or CPS, a UE may perform periodic TB transmission after the first TB by selecting a resource based on a partial sensing result obtained during the longest transmission resource period.

For example, after a UE selects Y candidate slots to perform PPS to (re)select resources for periodic transmission, when the UE tries to perform PPS for the most recent slot ahead of each candidate slot in time by k integer multiples of the transmission resource period for PPS and ahead of the first candidate slot among the Y candidate slots in time, if the most recent slot overlaps with a time point for UL transmission or overlaps with another transmission time point of the UE itself, the most recent slot may not be monitored. In this case, for example, the UE may perform monitoring for a slot ahead of the k integer multiple by one transmission resource period, a time point ahead by an integer multiple of (k+1). For example, if a case in which a slot ahead by an integer multiple of (k+1) cannot be monitored as in the above condition occurs, the UE may again monitor the slot at a time point ahead by an integer multiple of (k+2), and as long as the above conditions are satisfied, by repeating the above process, an integer multiple that is the final monitoring time point may be determined.

According to various embodiments of the present disclosure, by selectively applying random selection and CPS-based resource selection to the first packet of periodic transmission, there may be the effect of minimizing resource collisions.

On the other hand, existing transmission resource selection methods for resource re-evaluation may have a problem in that efficiency for power saving is lowered because CPS operation is not considered.

According to an embodiment of the present disclosure, a method for increasing efficiency for power saving by considering a CPS operation in a transmission resource selection method for resource re-evaluation and a device supporting the same are proposed.

For example, in order for a UE that has performed PPS and CPS to (re)select periodic transmission resources from a resource pool in which periodic transmission is allowed to perform resource re-evaluation (REV) or pre-emption checking (PEC), The UE may continue to perform the PPS performed to select a transmission resource set S-A from a candidate slot set C-A in the previous resource (re)selection process even after selecting the set S-A. For example, when slots at the time preceding by the transmission resource period used in the PPS and the integer value k times (e.g., k=1) for each transmission resource period are monitored, an additional PPS for REV/PEC monitoring slots corresponding to integer multiples of each transmission resource period from the slots at the time may be performed.

For example, in addition to the additional PPS for REV/PEC, additional CPS for REV/PEC may also be performed for a CPS window period having a length of a specific setting value prior to a time point ahead of each transmission resource in the S-A set by a UE processing time (e.g., T_proc,0+T_proc,1, where T_proc,0 is the UE processing time required to collect and analyze sensing results, and T_proc,1 is the UE processing time required to select a resource based on the sensing result).

For example, a resource selection window for REV/PEC may be configured identically to a resource selection window used in a previous resource (re)selection process.

For example, a resource selection window for REV/PEC may be configured to the union of time domains in which resource collisions can be determined based on CPS (e.g., 31 slots including the first candidate slot for determining resource collision based on CPS), determined based on the resource selection window used in the previous resource (re)selection process, the CPS window length, and the maximum time domain length between any two reserved resources that can be signaled as one SCI.

For example, when Y candidate slots are determined within a resource selection window by selection of periodic transmission resources being triggered in slot n, and when transmission resources are selected by the PPS and CPS being performed, when a collision of the previously selected transmission resource is detected based on REV or PEC and a new transmission resource is to be reselected, a power saving UE may determine candidate slots or candidate resources for the new transmission resource reselection in the following priority order.

1) For example, a power saving UE may select a candidate slot or candidate resource for REV/PEC as the first priority, among the Y candidate slots, among candidate slots or candidate resources belonging to the time domain in which transmission resource collision can be determined based on the additional CPS.

2) For example, a power saving UE may select a candidate slot or candidate resource for REV/PEC as the second priority, among the Y candidate slots, among candidate slots or candidate resources that do not belong to the time domain in which transmission resource collisions can be determined based on the additional CPS.

3) For example, a power saving UE may select a candidate slot or candidate resource for REV/PEC as the third priority, among the resources not belonging to the Y candidate slots within the resource selection window, among candidate slots or resources belonging to the time domain in which transmission resource collisions can be determined based on the additional CPS.

4) For example, a power saving UE may select a candidate slot or candidate resource for REV/PEC as the fourth priority, among the resources that do not belong to the Y candidate slots within the resource selection window, among candidate slots or resources that do not belong to the time domain in which transmission resource collisions can be determined based on the additional CPS.

5) For example, a power saving UE may select a candidate slot or candidate resource for REV/PEC as the fifth priority, among candidate slots or resources belonging to the time domain in which transmission resource collisions can be determined based on the additional CPS within a new resource selection window, after determining the new resource selection window after the resource selection window based on a specific setting value or UE implementation.

6) For example, a power saving UE may select a candidate slot or candidate resource for REV/PEC as the sixth priority, among candidate slots or resources that do not belong to the time domain in which transmission resource collisions can be determined based on the additional CPS within a new resource selection window, after determining the new resource selection window after the resource selection window based on a specific setting value or UE implementation.

For example, in the process of determining candidate slots or candidate resources for the above-described new transmission resource reselection, a power saving UE may select a transmission resource described in 3) as the second priority, and may select a transmission resource described in 2) as the third priority.

For example, in the process of determining candidate slots or candidate resources for the above-described new transmission resource reselection, the minimum number of candidate slots or the minimum number of candidate resources may be separately configured differently for processes 1) to 6).

According to an embodiment of the present disclosure, when Y candidate slots are determined within a resource selection window by selection of periodic transmission resources being triggered in slot n, and when transmission resources are selected by the PPS and CPS being performed, when a collision of the previously selected transmission resource is detected based on REV or PEC and a new transmission resource is to be reselected, the physical layer of a power saving UE may determine idle resources for reselection of the new transmission resource in the following priority order and report it to the MAC layer.

7) For example, a UE may select a resource that does not collide with transmission resources of other UEs as the first priority based on the PPS and the CPS and/or the additional PPS and the additional CPS, among the Y candidate slots, among candidate slots or candidate resources belonging to the time domain in which transmission resource collision can be determined based on the additional CPS.

8) For example, a UE may select a resource that does not collide with transmission resources of other UEs as the second priority based on the PPS and the CPS and/or the additional PPS and the additional CPS, among the Y candidate slots, among candidate slots or candidate resources that do not belong to the time domain in which transmission resource collisions can be determined based on the additional CPS.

9) For example, a UE may select a resource that does not collide with transmission resources of other UEs as the third priority based on the PPS and the CPS and/or the additional PPS and the additional CPS, among the resources not belonging to the Y candidate slots within the resource selection window, among candidate slots or resources belonging to the time domain in which transmission resource collisions can be determined based on the additional CPS.

10) For example, a UE may select a resource that does not collide with transmission resources of other UEs as the fourth priority based on the PPS and the CPS and/or the additional PPS and the additional CPS, among resources not belonging to the Y candidate slots within the resource selection window, among resources not belonging to a time domain in which transmission resource collisions can be determined based on the additional CPS.

11) For example, a UE may select a resource that does not collide with transmission resources of other UEs as the fifth priority based on the PPS and the CPS and/or the additional PPS and the additional CPS, among candidate slots or resources belonging to the time domain in which transmission resource collisions can be determined based on the additional CPS within a new resource selection window, after determining the new resource selection window after the resource selection window based on a specific setting value or UE implementation.

12) For example, a UE may select a resource that does not collide with transmission resources of other UEs as the fifth priority based on the PPS and the CPS and/or the additional PPS and the additional CPS, among candidate slots or resources that do not belong to the time domain in which transmission resource collisions can be determined based on the additional CPS within a new resource selection window, after determining the new resource selection window after the resource selection window based on a specific setting value or UE implementation.

For example, a UE may select the transmission resource described in 9) as the second priority, and may select the transmission resource described in 8) as the third priority in the process of determining idle resources for reselection of new transmission resources described above.

For example, in the process of determining idle resources for reselection of new transmission resources described above, when compared with an RSRP threshold used to select idle resources, the number of targeted idle resources (or, the ratio of the number of idle resources to the total number of available resources), and the RSRP threshold, if it is less than the number of idle resources targeted, an incremental RSRP step value for increasing the RSRP threshold may be separately configured differently from the 7) process to the 12) process.

For example, when selection of periodic transmission resources is triggered in slot n, Y candidate slots are determined within a resource selection window, and transmission resources are selected by performing the PPS and CPS, when a collision of the previously selected transmission resources is detected based on REV or PEC and a new transmission resource is to be reselected, the MAC layer of a power saving UE may reselect the new transmission resource in the following priority order.

13) For example, among the Y candidate slots, among candidate slots or candidate resources belonging to a time domain in which transmission resource collisions can be determined based on the additional CPS, a UE may select a resource that does not collide with a transmission resource of another UE as the first priority based on the PPS and the CPS and/or the additional PPS and the additional CPS.

14) For example, among the Y candidate slots, among candidate slots or candidate resources that do not belong to a time domain in which transmission resource collisions can be determined based on the additional CPS, a UE may select a resource that does not collide with a transmission resource of another UE as the second priority based on the PPS and the CPS and/or the additional PPS and the additional CPS.

15) For example, among resources not belonging to the Y candidate slots within the resource selection window, among the candidate slots or resources belonging to the time domain in which transmission resource collisions can be determined based on the additional CPS, a UE may select a resource that does not collide with a transmission resource of another UE as the third priority based on the PPS and the CPS and/or the additional PPS and the additional CPS.

16) For example, among resources that do not belong to the Y candidate slots within the resource selection window, among the resources not belonging to the time domain in which transmission resource collision can be determined based on the additional CPS, a UE may select a resource that does not collide with a transmission resource of another UE as the fourth priority based on the PPS and the CPS and/or the additional PPS and the additional CPS.

17) For example, after determining a new resource selection window after the resource selection window based on a specific setting value or UE implementation, among candidate slots or resources belonging to the time domain in which transmission resource collisions can be determined based on the additional CPS within the new resource selection window, a UE may select a resource that does not collide with a transmission resource of another UE as the fifth priority based on the PPS and the CPS and/or the additional PPS and the additional CPS.

18) For example, after determining a new resource selection window after the resource selection window based on a specific setting value or UE implementation, among candidate slots or resources that do not belong to the time domain in which transmission resource collisions can be determined based on the additional CPS within the new resource selection window, a UE may select a resource that does not collide with a transmission resource of another UE as the fifth priority based on the PPS and the CPS and/or the additional PPS and the additional CPS.

For example, in the process of determining idle resources for reselection of new transmission resources described above, a UE may select the transmission resource described in 15) as the second priority, and may select the transmission resource described in 14) as the third priority.

According to various embodiments of the present disclosure, An effect of increasing efficiency for power saving may occur by considering a CPS operation in a transmission resource selection scheme for resource re-evaluation.

According to the existing technology, when partial sensing is performed on candidate slots that are targeted for partial sensing, there is a problem in that the power saving effect is lowered due to the overlapping partial sensing since sensing is performed again even though the results of sensing already performed for some of the candidate slots exist. According to the method proposed in the present disclosure, a power saving effect can be improved by including a slot having already been sensed and having a sensing result as a candidate slot to be subjected to partial sensing, so that sensing is not performed again on the same slot.

Figure 13:
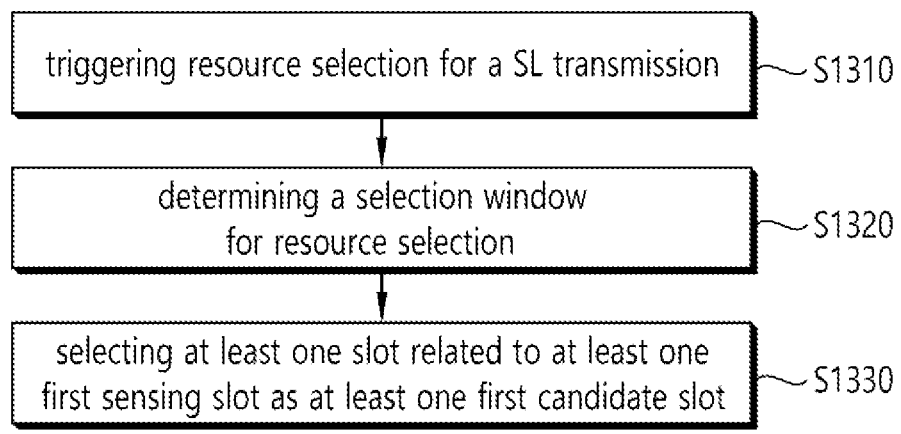
FIG. 13 shows a procedure in which a first apparatus performs wireless communication, according to an embodiment of the present disclosure.

FIG. 13 shows a procedure for performing wireless communication by a first device according to an embodiment of the present disclosure. The embodiment of FIG. 13 may be combined with various embodiments of the present disclosure.

Referring to FIG. 13, in step S1310, a first device may trigger resource selection for a sidelink (SL) transmission. In step S1320, the first device may determine a selection window for the resource selection. In step S1330, the first device may select at least one slot related to at least one first sensing slot as at least one first candidate slot. For example, the at least one first candidate slot may be included within the selection window.

For example, additionally, the first device may select a second candidate slot for performing the resource selection, within the selection window. For example, the at least one first sensing slot may be determined based on the second candidate slot, and the at least one first candidate slot may include the second candidate slot.

For example, the selection window may be determined in a resource pool in which a periodic transmission is allowed.

For example, the at least one third candidate slot may be selected as the at least one first candidate slot, based on at least one third candidate slot related to period-based partial sensing (PBPS) being included in at least one slot related to the at least one first sensing slot.

For example, the SL transmission may be an aperiodic transmission.

For example, the at least one first sensing slot may be included within a contiguous partial sensing (CPS) window.

For example, the CPS window may end in a slot previous to the at least one first candidate slot by time determined based on processing time of the first device.

For example, the CPS window may start at a slot previous to the at least one first candidate slot by a length of CPS window.

For example, additionally, the first device may perform partial sensing for at least one second sensing slot related to the at least one first candidate slot.

For example, additionally, the first device may determine at least one resource selection candidate resource within the resource selection window, based on a result of the partial sensing; and select at least one transmission resource for the SL transmission, based on the at least one resource selection candidate resource.

For example, additionally, the first device may transmit, to a second device, sidelink control information (SCI) for scheduling of a physical sidelink shared channel (PSSCH) through a physical sidelink control channel (PSCCH), based on the at least one transmission resource; and transmit, to the second device, a medium access control (MAC) protocol data unit (PDU) through the PSSCH, based on the at least one transmission resource.

For example, the at least one first candidate slot may be selected based on a threshold number related to the at least one first candidate slot.

For example, additionally, the first device may include at least one slot, within the selection window, other than a slot related to the at least one first sensing slot into the at least one first candidate slot, based on a number of the at least one first candidate slot being less than the threshold number related to the at least one first candidate slot.

The above-described embodiment may be applied to various devices described below. For example, a processor 102 of a first device 100 may trigger resource selection for a sidelink (SL) transmission. And, the processor 102 of the first device 100 may determine a selection window for the resource selection. And, the processor 102 of the first device 100 may select at least one slot related to at least one first sensing slot as at least one first candidate slot. For example, the at least one first candidate slot may be included within the selection window.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: trigger resource selection for a sidelink (SL) transmission; determine a selection window for the resource selection; and select at least one slot related to at least one first sensing slot as at least one first candidate slot, wherein the at least one first candidate slot may be included within the selection window.

For example, additionally, the first device may select a second candidate slot for performing the resource selection, within the selection window. For example, the at least one first sensing slot may be determined based on the second candidate slot, and the at least one first candidate slot may include the second candidate slot.

For example, the selection window may be determined in a resource pool in which a periodic transmission is allowed.

For example, the at least one third candidate slot may be selected as the at least one first candidate slot, based on at least one third candidate slot related to period-based partial sensing (PBPS) being included in at least one slot related to the at least one first sensing slot.

For example, the SL transmission may be an aperiodic transmission.

For example, the at least one first sensing slot may be included within a contiguous partial sensing (CPS) window.

For example, the CPS window may end in a slot previous to the at least one first candidate slot by time determined based on processing time of the first device.

For example, the CPS window may start at a slot previous to the at least one first candidate slot by a length of CPS window.

For example, additionally, the first device may perform partial sensing for at least one second sensing slot related to the at least one first candidate slot.

For example, additionally, the first device may determine at least one resource selection candidate resource within the resource selection window, based on a result of the partial sensing; and select at least one transmission resource for the SL transmission, based on the at least one resource selection candidate resource.

For example, additionally, the first device may transmit, to a second device, sidelink control information (SCI) for scheduling of a physical sidelink shared channel (PSSCH) through a physical sidelink control channel (PSCCH), based on the at least one transmission resource; and transmit, to the second device, a medium access control (MAC) protocol data unit (PDU) through the PSSCH, based on the at least one transmission resource.

For example, the at least one first candidate slot may be selected based on a threshold number related to the at least one first candidate slot.

For example, additionally, the first device may include at least one slot, within the selection window, other than a slot related to the at least one first sensing slot into the at least one first candidate slot, based on a number of the at least one first candidate slot being less than the threshold number related to the at least one first candidate slot.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: trigger resource selection for a sidelink (SL) transmission; determine a selection window for the resource selection; and select at least one slot related to at least one first sensing slot as at least one first candidate slot, wherein the at least one first candidate slot may be included within the selection window.

According to an embodiment of the present disclosure, a non-transitory computer-readable storage medium storing instructions may be proposed. For example, the instructions, when executed, may cause a first device to: trigger resource selection for a sidelink (SL) transmission; determine a selection window for the resource selection; and select at least one slot related to at least one first sensing slot as at least one first candidate slot, wherein the at least one first candidate slot may be included within the selection window.

Figure 14:
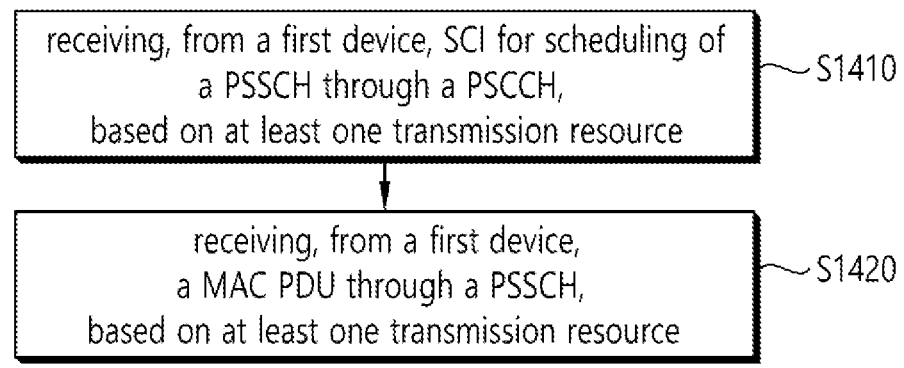
FIG. 14 shows a procedure in which a second apparatus performs wireless communication, according to an embodiment of the present disclosure.

FIG. 14 shows a procedure for a second device to perform wireless communication according to an embodiment of the present disclosure. The embodiment of FIG. 14 may be combined with various embodiments of the present disclosure.

Referring to FIG. 14, in step S1410, a second device may receive, from a first device, sidelink control information (SCI) for scheduling of a physical sidelink shared channel (PSSCH) through a physical sidelink control channel (PSCCH), based on at least one transmission resource. In step S1420, the second device may receive, from the first device, a medium access control (MAC) protocol data unit (PDU) through the PSSCH, based on the at least one transmission resource. For example, the at least one transmission resource may be selected within a selection window based on a result of partial sensing, the partial sensing may be performed on at least one second sensing slot related to at least one first candidate slot, and the at least one first candidate slot may include at least one slot related to at least one first sensing slot.

For example, the at least one first candidate slot may include a second candidate slot, and wherein the at least one first sensing slot may be determined based on the second candidate slot.

The above-described embodiment may be applied to various devices described below. For example, a processor 202 of a second device 200 may control a transceiver 206 to receive, from a first device 100, sidelink control information (SCI) for scheduling of a physical sidelink shared channel (PSSCH) through a physical sidelink control channel (PSCCH), based on at least one transmission resource. And, the processor 202 of the second device 200 may control the transceiver 206 to receive, from the first device 100, a medium access control (MAC) protocol data unit (PDU) through the PSSCH, based on the at least one transmission resource. For example, the at least one transmission resource may be selected within a selection window based on a result of partial sensing, the partial sensing may be performed on at least one second sensing slot related to at least one first candidate slot, and the at least one first candidate slot may include at least one slot related to at least one first sensing slot.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, sidelink control information (SCI) for scheduling of a physical sidelink shared channel (PSSCH) through a physical sidelink control channel (PSCCH), based on at least one transmission resource; and receive, from the first device, a medium access control (MAC) protocol data unit (PDU) through the PSSCH, based on the at least one transmission resource, wherein the at least one transmission resource may be selected within a selection window based on a result of partial sensing, wherein the partial sensing may be performed on at least one second sensing slot related to at least one first candidate slot, and wherein the at least one first candidate slot may include at least one slot related to at least one first sensing slot.

For example, the at least one first candidate slot may include a second candidate slot, and wherein the at least one first sensing slot may be determined based on the second candidate slot.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
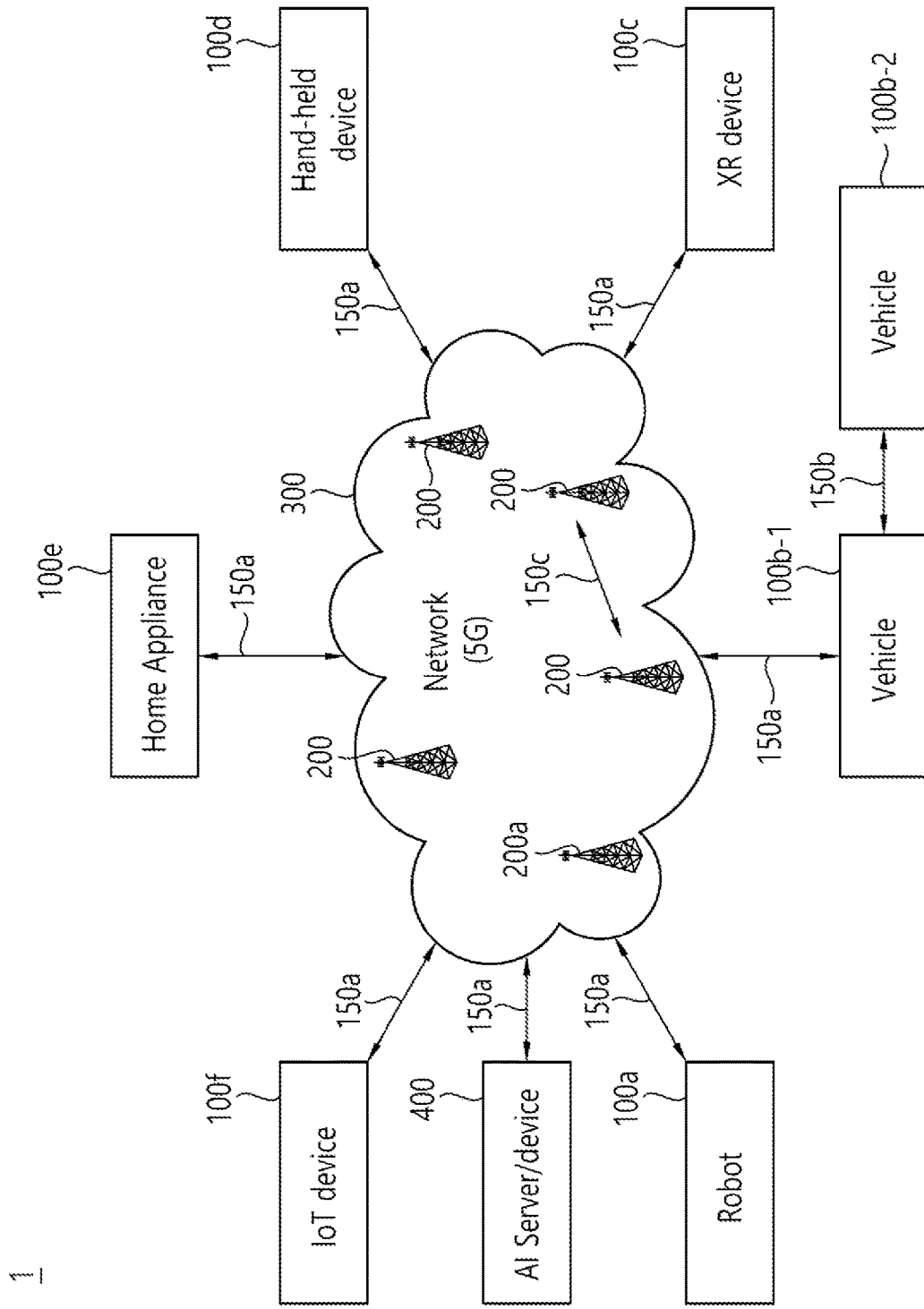
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1)

LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
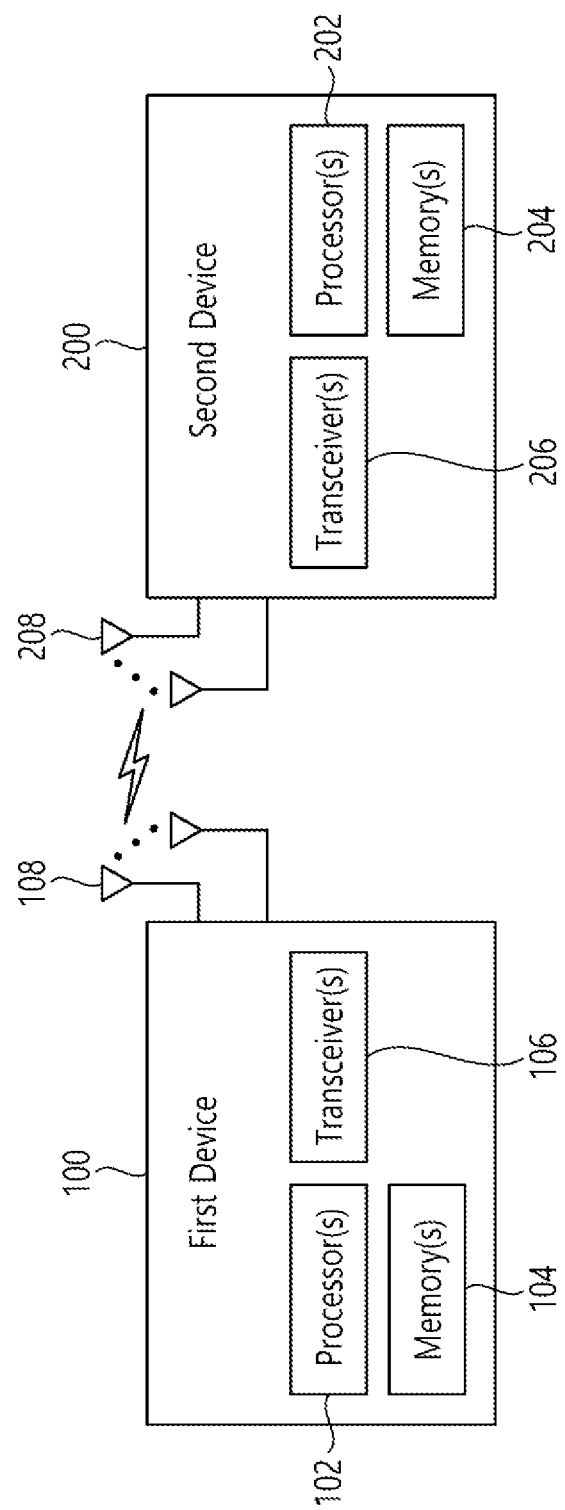
FIG. 16 shows wireless devices, based on an embodiment of the present disclosure.

FIG. 16 shows wireless devices, based on an embodiment of the present disclosure. The embodiment of FIG. 16 may be combined with various embodiments of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to being driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
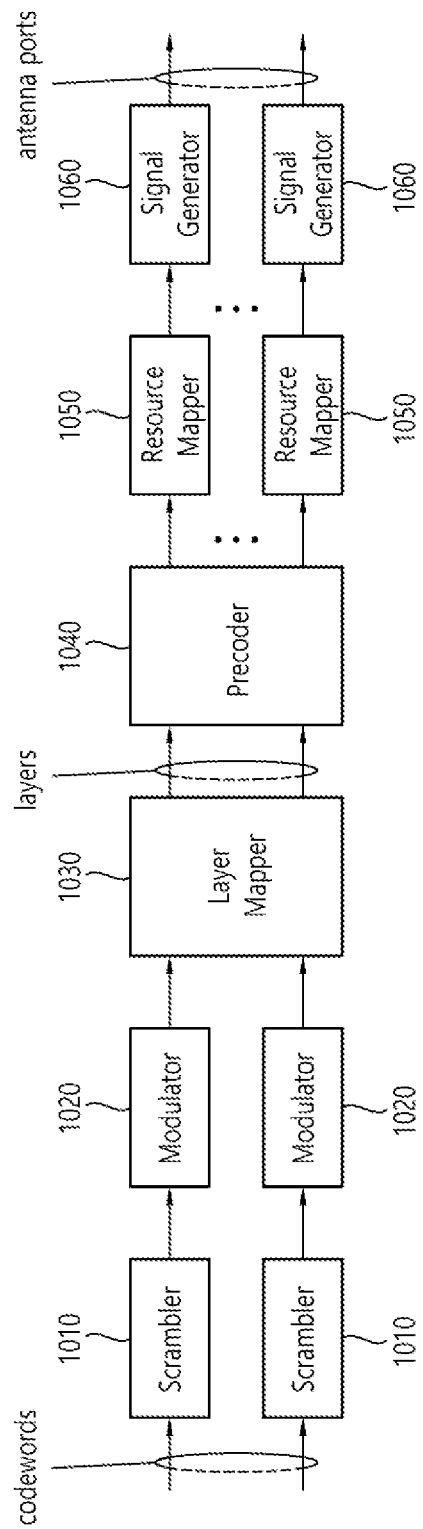
FIG. 17 shows a signal process circuit for a transmission signal, based on an embodiment of the present disclosure.

FIG. 17 shows a signal process circuit for a transmission signal, based on an embodiment of the present disclosure. The embodiment of FIG. 17 may be combined with various embodiments of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
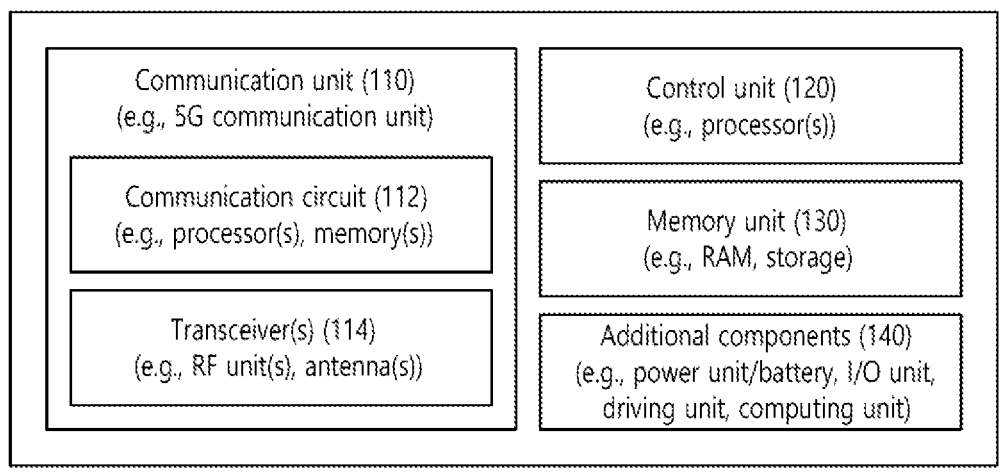
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15). The embodiment of FIG. 18 may be combined with various embodiments of the present disclosure.

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
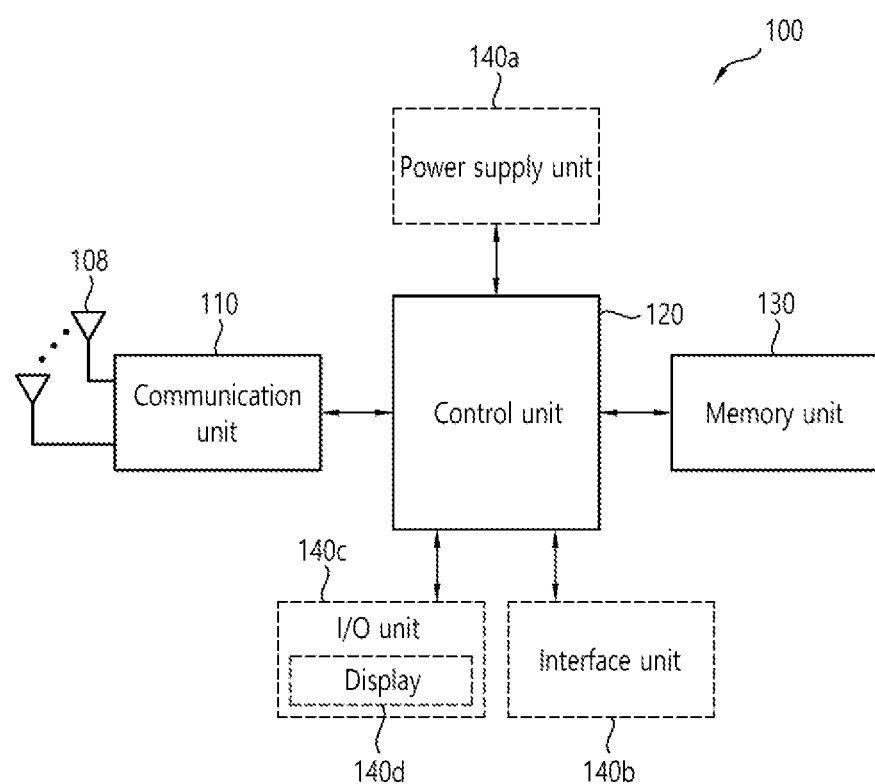
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 19 may be combined with various embodiments of the present disclosure.

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 20 may be combined with various embodiments of the present disclosure.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
 performing first sensing for at least one first sensing slot;
 triggering resource selection for a sidelink (SL) transmission;
 determining a selection window for the resource selection; and
 determining at least one slot within the selection window as at least one first candidate slot, based on a result of the first sensing.

2. The method of claim 1, further comprising:
 determining at least one second sensing slot, based on the at least one first candidate slot.

3. The method of claim 1, wherein the selection window is determined in a resource pool in which a periodic transmission is allowed.

4. The method of claim 1, wherein the at least one slot is determined as the at least one first candidate slot, based on the first sensing being period-based partial sensing (PBPS).

5. The method of claim 1, wherein the SL transmission is an aperiodic transmission.

6. The method of claim 1, further comprising:
determining at least one second sensing slot, based on the at least one first candidate slot,
wherein the at least one second sensing slot is included within a contiguous partial sensing (CPS) window.

7. The method of claim 6, wherein the CPS window ends in a slot previous to the at least one first candidate slot by time determined based on processing time of the first device.

8. The method of claim 6, wherein the CPS window starts at a slot previous to the at least one first candidate slot by a length of CPS window.

9. The method of claim 1, further comprising:
performing partial sensing for at least one second sensing slot related to the at least one first candidate slot.

10. The method of claim 9, further comprising:
determining at least one resource selection candidate resource within the resource selection window, based on a result of the partial sensing; and
selecting at least one transmission resource for the SL transmission, based on the at least one resource selection candidate resource.

11. The method of claim 10, further comprising:
transmitting, to a second device, sidelink control information (SCI) for scheduling of a physical sidelink shared channel (PSSCH) through a physical sidelink control channel (PSCCH), based on the at least one transmission resource; and
transmitting, to the second device, a medium access control (MAC) protocol data unit (PDU) through the PSSCH, based on the at least one transmission resource.

12. The method of claim 1, wherein the at least one first candidate slot is selected based on a threshold number related to the at least one first candidate slot.

13. The method of claim 12, further comprising:
including at least one slot, within the selection window, other than a slot related to the at least one first sensing slot into the at least one first candidate slot, based on a number of the at least one first candidate slot being less than the threshold number related to the at least one first candidate slot.

14. A first device for performing wireless communication, the first device comprising:
one or more memories storing instructions;
one or more transceivers; and
one or more processors connected to the one or more memories and the one or more transceivers, wherein the one or more processors execute the instructions to:
perform first sensing for at least one first sensing slot
trigger resource selection for a sidelink (SL) transmission;
determine a selection window for the resource selection; and
determine at least one slot within the selection window as at least one first candidate slot, based on a result of the first sensing.

15. A device adapted to control a first user equipment (UE), the device comprising:
one or more processors; and
one or more memories operably connectable to the one or more processors and storing instructions, wherein the one or more processors execute the instructions to:
perform first sensing for at least one first sensing slot
trigger resource selection for a sidelink (SL) transmission;
determine a selection window for the resource selection; and
determine at least one slot within the selection window as at least one first candidate slot, based on a result of the first sensing.

* * * * *